US008231063B2

(12) United States Patent
Poidomani et al.

(10) Patent No.: US 8,231,063 B2
(45) Date of Patent: *Jul. 31, 2012

(54) ELECTRONIC CARD AND METHODS FOR MAKING SAME

(75) Inventors: Mark Poidomani, Windermere, FL (US); Joan Ziegler, Newbury Park, CA (US); Eric Foo, Thousand Oaks, CA (US); Ziv Alon, Newbury Park, CA (US); Charles McGuire, Newbury Park, CA (US); Lawrence Routhenstein, Ocoee, FL (US)

(73) Assignee: PrivaSys Inc., Newbury Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/102,991

(22) Filed: May 6, 2011
(Under 37 CFR 1.47)

(65) Prior Publication Data
US 2011/0266354 A1    Nov. 3, 2011

Related U.S. Application Data

(63) Continuation of application No. 12/726,868, filed on Mar. 18, 2010, now Pat. No. 7,954,724, which is a continuation of application No. 11/413,595, filed on Apr. 27, 2006, now abandoned, which is a continuation-in-part of application No. 11/391,719, filed on Mar. 27, 2006, now abandoned.

(60) Provisional application No. 60/675,388, filed on Apr. 27, 2005, provisional application No. 60/594,300, filed on Mar. 26, 2005.

(51) Int. Cl.
*G06K 19/06* (2006.01)
*G06K 7/06* (2006.01)

(52) U.S. Cl. ..... 235/492; 235/375; 235/380; 235/382.5; 235/451

(58) Field of Classification Search .................. 235/375, 235/380, 382.5, 449, 451, 492, 493
See application file for complete search history.

(56) References Cited

U.S. PATENT DOCUMENTS

| 4,353,064 A | 10/1982 | Stamm |
| 4,394,654 A | 7/1983 | Hofmann-Cerfontaine |
| 4,529,870 A | 7/1985 | Chaum |
| 4,614,861 A | 9/1986 | Pavlov et al. |
| 4,667,087 A | 5/1987 | Quintana |
| 4,701,601 A | 10/1987 | Francini et al. |

(Continued)

FOREIGN PATENT DOCUMENTS
WO    WO9852735    11/1998
(Continued)

*Primary Examiner* — Tuyen K Vo
(74) *Attorney, Agent, or Firm* — Roy L Anderson; Wagner, Anderson & Bright, P.C.

(57) ABSTRACT

An electronic card includes a digital processor, an electrochemical battery and a communications port. The processor and battery are essentially coplanar, and are sandwiched between and enclosed by two flexible covers, preferably made from an insulating plastic material, and preferably fitted to the components that they enclose. The communications port can include, for example, a Smart Card contact port, a stripe emulator, an RF port, and IR port, etc. The battery may comprise a rechargeable battery. In an exemplary embodiment, at least the processor is carried by a flexible printed circuit (PC) board. In other exemplary embodiments, switches and/or indicators are also carried by the PC.board. A method for manufacturing an electronic card having at least two components is also disclosed.

17 Claims, 18 Drawing Sheets

U.S. PATENT DOCUMENTS

| | | |
|---|---|---|
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,272,596 A | 12/1993 | Honore |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman et al. |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A * | 4/1997 | Lane .......................... 382/124 |
| 5,657,388 A | 8/1997 | Weiss |
| 5,748,737 A | 5/1998 | Daggar |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski, Jr. |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,163,771 A | 12/2000 | Walker et al. |
| 6,176,430 B1 | 1/2001 | Finkelstein et al. |
| 6,182,894 B1 | 2/2001 | Hackett et al. |
| 6,189,098 B1 | 2/2001 | Kaliski, Jr. |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski, Jr. et al. |
| 6,313,724 B1 | 11/2001 | Osterweil |
| 6,323,770 B1 | 11/2001 | Dames |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,641,050 B2 | 11/2003 | Kelley et al. |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,769,618 B1 | 8/2004 | Finkelstein |
| 6,776,332 B2 | 8/2004 | Allen et al. |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,853,412 B2 | 2/2005 | Stephenson |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,143,953 B2 | 12/2006 | Takahashi et al. |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,237,724 B2 | 7/2007 | Singleton |
| 7,246,752 B2 | 7/2007 | Brown |
| 7,278,586 B2 | 10/2007 | Takahashi et al. |
| 7,298,243 B2 | 11/2007 | Juels et al. |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Liu et al. |
| 7,359,507 B2 | 4/2008 | Kaliski, Jr. |
| 7,360,688 B1 | 4/2008 | Harris |
| 7,363,494 B2 | 4/2008 | Brainard et al. |
| 7,380,710 B2 | 6/2008 | Brown |
| 7,389,425 B2 | 6/2008 | Hasbun et al. |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,532,104 B2 | 5/2009 | Juels |
| 7,543,739 B2 | 6/2009 | Brown et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,641,124 B2 | 1/2010 | Brown et al. |
| 7,660,902 B2 | 2/2010 | Graham et al. |
| 7,938,329 B2 * | 5/2011 | Tran .......................... 235/451 |
| 7,954,715 B2 | 6/2011 | Narendra et al. |
| 7,954,716 B2 | 6/2011 | Narendra et al. |
| 7,954,717 B2 | 6/2011 | Narendra et al. |
| 2001/0034702 A1 | 10/2001 | Mockett et al. |
| 2001/0047335 A1 | 11/2001 | Arndt et al. |
| 2002/0043566 A1 | 4/2002 | Goodman et al. |
| 2002/0059114 A1 | 5/2002 | Cockrill et al. |
| 2002/0066039 A1 * | 5/2002 | Dent .......................... 713/202 |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2002/0174031 A1 * | 11/2002 | Weiss .......................... 705/26 |
| 2003/0034388 A1 | 2/2003 | Routhenstein et al. |
| 2003/0052168 A1 | 3/2003 | Wong |
| 2003/0057278 A1 | 3/2003 | Wong |
| 2003/0105964 A1 | 6/2003 | Brainard et al. |
| 2003/0116635 A1 | 6/2003 | Taban |
| 2003/0152253 A1 | 8/2003 | Wong |
| 2003/0173409 A1 | 9/2003 | Vogt et al. |

| | | |
|---|---|---|
| 2003/0179909 A1 | 9/2003 | Wong et al. |
| 2003/0179910 A1 | 9/2003 | Wong |
| 2003/0226899 A1 | 12/2003 | Finkelstein |
| 2003/0234294 A1 | 12/2003 | Uchihiro et al. |
| 2004/0035942 A1 | 2/2004 | Silverman |
| 2004/0129787 A1* | 7/2004 | Saito et al. ............... 235/492 |
| 2004/0133787 A1 | 7/2004 | Doughty et al. |
| 2004/0162732 A1 | 8/2004 | Rahim et al. |
| 2004/0172535 A1 | 9/2004 | Jakobsson et al. |
| 2004/0177045 A1 | 9/2004 | Brown |
| 2004/0179718 A1* | 9/2004 | Chou ............... 382/115 |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0107157 A1* | 5/2005 | Wachtfogel et al. ........ 463/29 |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski, Jr. et al. |
| 2006/0059285 A1* | 3/2006 | Fischer et al. ............... 710/124 |
| 2006/0085328 A1 | 4/2006 | Cohen et al. |
| 2006/0091223 A1 | 5/2006 | Zellner et al. |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0186209 A1 | 8/2006 | Narendra et al. |
| 2006/0212407 A1* | 9/2006 | Lyon ............... 705/71 |
| 2006/0256961 A1 | 11/2006 | Brainard et al. |
| 2007/0114274 A1 | 5/2007 | Gibbs et al. |
| 2007/0174614 A1 | 7/2007 | Duane et al. |
| 2007/0192249 A1 | 8/2007 | Biffle et al. |
| 2007/0241201 A1 | 10/2007 | Brown et al. |
| 2008/0040271 A1 | 2/2008 | Hammad et al. |
| 2008/0040276 A1 | 2/2008 | Hammad et al. |
| 2008/0096326 A1 | 4/2008 | Reed |
| 2008/0148394 A1 | 6/2008 | Poidomani et al. |
| 2009/0108064 A1 | 4/2009 | Fernandes et al. |
| 2009/0255996 A1 | 10/2009 | Brown et al. |
| 2011/0158228 A1* | 6/2011 | Dowling et al. ............... 370/352 |

FOREIGN PATENT DOCUMENTS

| | | |
|---|---|---|
| WO | WO0247019 A1 | 6/2002 |
| WO | WO2006105092 | 10/2006 |
| WO | WO2006116772 | 11/2006 |

* cited by examiner

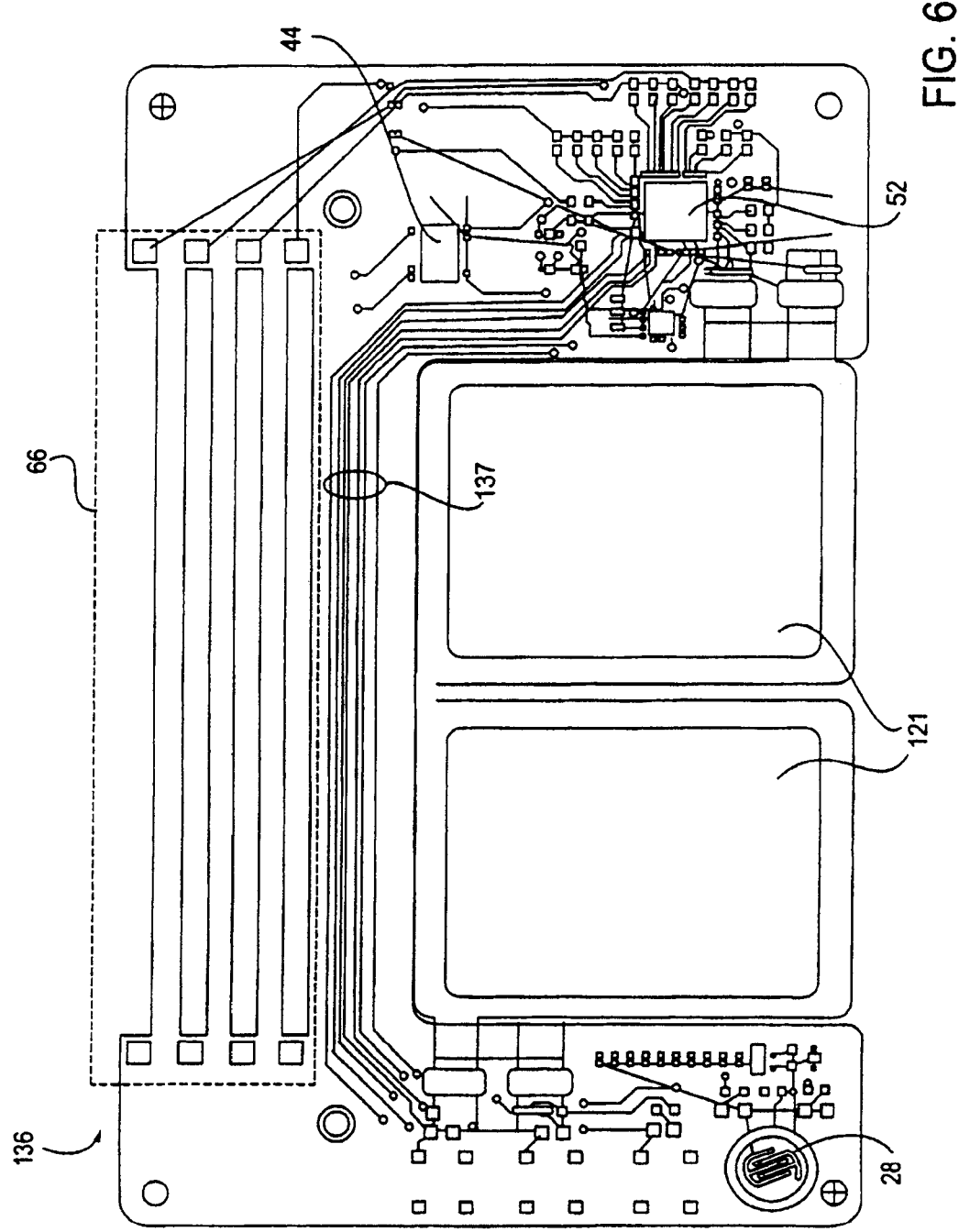

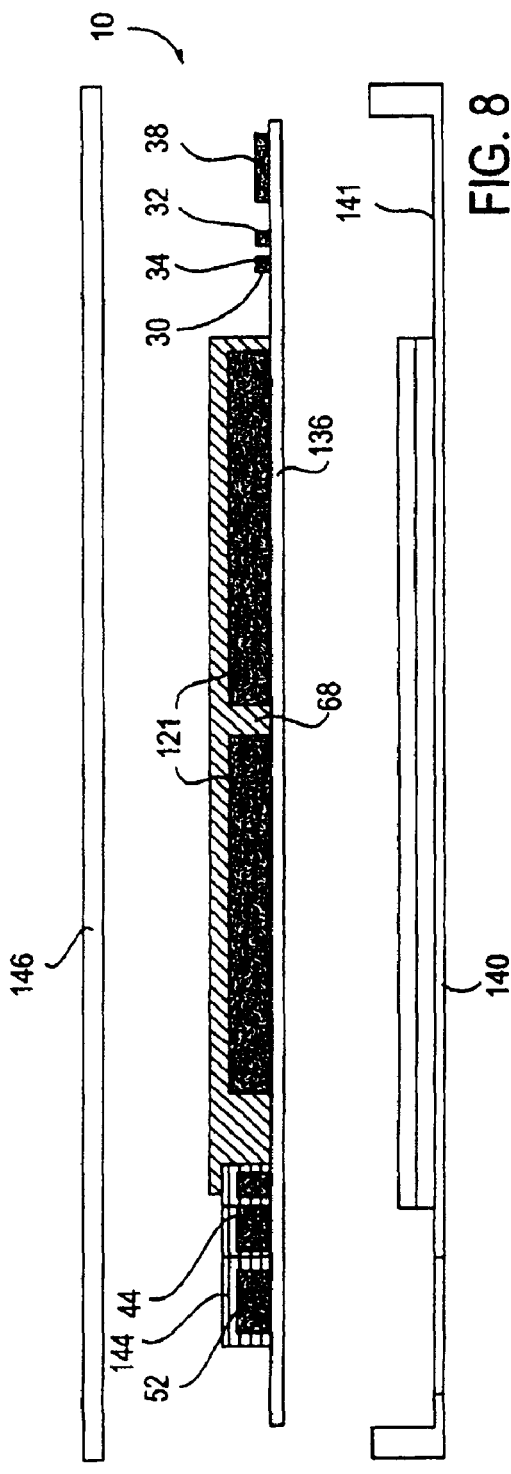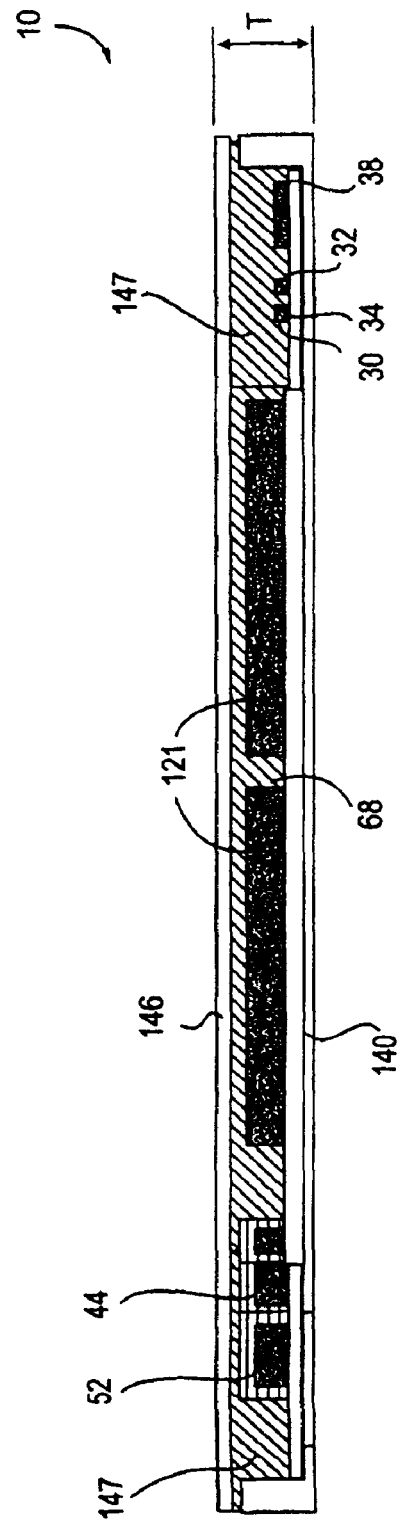

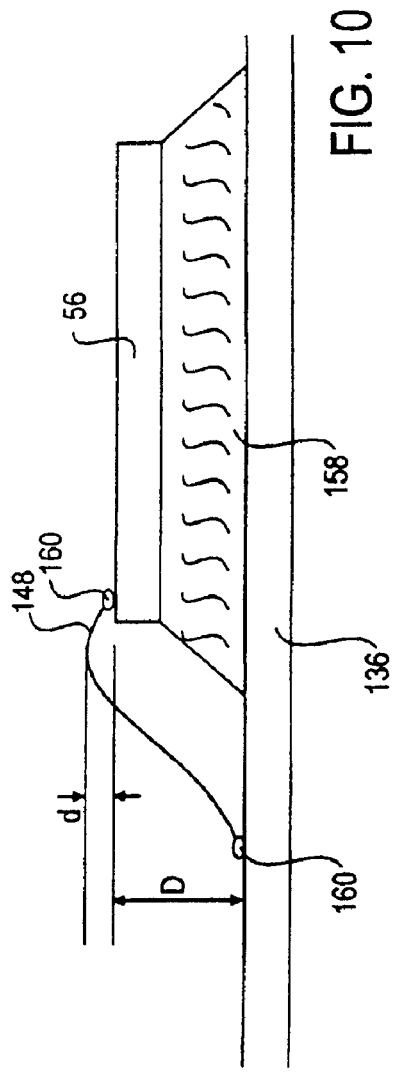
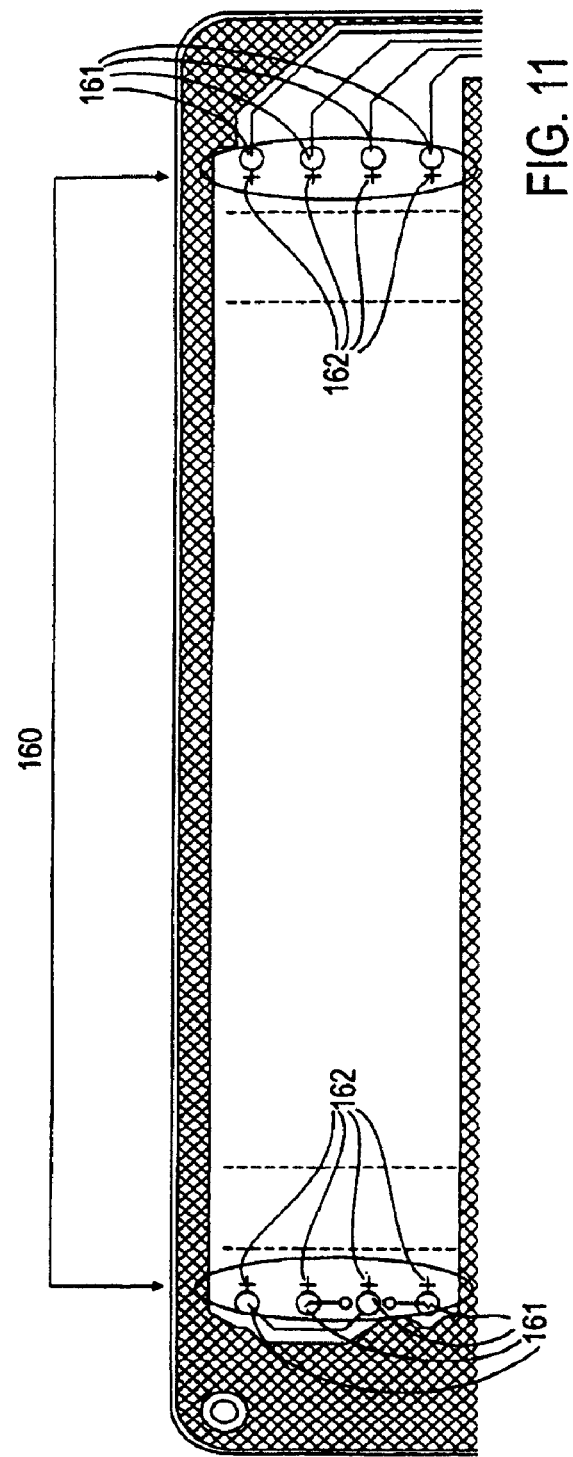

ELECTRONIC CARD AND METHODS FOR MAKING SAME

CROSS REFERENCE TO RELATED APPLICATIONS

This application is a continuation of U.S. Ser. No. 12/726,868 filed Mar. 18, 2010 now U.S. Pat. No. 7,954,724, which was a continuation of U.S. Ser. No. 11/413,595, filed Apr. 27, 2006 now abandoned which was a continuation-in-part of U.S. Ser. No. 11/391,719 filed Mar. 27, 2006 now abandoned, which claims the benefit of U.S. Ser. Nos. 60/675,388 filed Apr. 27, 2005 and 60/594,300 filed Mar. 26, 2005, all of which applications are specifically incorporated herein by reference. In addition, U.S. Ser. No. 11/391,719 claims the benefit of U.S. Ser. No. 60/594,300 filed Mar. 26, 2005, the disclosure of which is also incorporated herein by reference.

BACKGROUND

Exemplary embodiments disclosed herein pertain to electronic cards. More particularly, exemplary embodiments disclosed herein pertain to secure electronic cards and methods for making same.

There are a great many applications for electronic security. For example, security is desirable or required for financial transactions, or for providing access to various physical and non-physical resources. One area of great concern for electronic security is in the field of financial transaction cards, e.g. credit and debit cards.

Conventional credit cards, debit cards and other financial transaction cards (hereafter "transaction cards") have a typically plastic body upon which is embossed a 16 digit account number and other data. A magnetic strip, usually referred to as a "stripe", is adhered to the back of the card. The stripe typically magnetically encodes the account number and/or other data.

A stripe is typically a magnetic tape material much like the magnetic tape used in digital data recording. The stripe material typically includes a magnetic oxide and binder compounds that provide the magnetic stripe with data encoding capabilities and physical durability characteristics needed for transaction card applications. While these magnetic tape components have been optimized for transaction card applications the magnetic tape used for the magnetic stripe on a transaction card is very similar to standard digital data recording tape.

The two most common magnetic oxides used in magnetic stripe cards are referred to as low coercivity (LoCo) and high coercivity (HiCo) magnetic oxides. Coercivity measures how difficult it is to magnetize or demagnetize the stripe and is measured in oersteds. Low coercivity magnetic stripes are typically 300 oersteds and high coercivity magnetic stripes are above 2700 oersteds. A high coercivity magnetic stripe requires about three times more energy to encode or erase than does a low coercivity magnetic stripe. Many transaction card applications have gone to HiCo magnetic stripes because it is much harder to accidentally erase the encoded data than on LoCo magnetic stripes. This provides greater durability and readability of the encoded data in use for many applications.

The encoding of the magnetic stripe on a transaction card typically follows standard digital recording techniques but is again optimized for transaction card applications. The encoded data takes the form of zones of magnetization in the magnetic stripe with alternate magnetic polarities. The north and south poles' of the magnetized zones alternate in direction providing an encoding technique that can represent the binary "zeroes" and "ones" of a binary digital code.

The standard encoding technique for the magnetic stripe on a transaction card is the F2F (Aiken double frequency) code where a binary zero is represented by a long magnetized zone and a binary one is represented by two magnetized zones, each one half the length of the zero—a long magnetized zone. The exact length of these zones of magnetization is determined by how much data needs to be recorded on the magnetic stripe. For example Track. 2 data is encoded at 75 bits per inch or 75 long zero zones per inch—International Standards Organization (ISO) specifications 7811-2/6. That equates to 0.01333 inches in length for the zero magnetized zone. The binary one would then be two zones of one half that length or 0.00666 inches in length. Other lengths can be obtained for different data densities such as the 210 bits per inch used in Track 1 and Track 2 of the magnetic stripe.

Reading the encoded data in the magnetic stripe is accomplished by capturing the magnetic flux field extending from the magnetized zones in the stripe by a magnetic read head. The read head converts the changing magnetic flux in the coil of the read head to a voltage pattern mirroring the magnetization zones of the encoded data. The voltage pattern can then be translated by the decoding electronics into the binary zeroes and ones of the data as is well known in the industry.

A magnetic stripe encoder consists of a magnetic write head and an electronic current drive circuit capable of magnetizing the magnetic oxide in the stripe to full magnetization (saturation). The encoding current in the write head is capable of alternating direction thereby producing alternating zones of magnetization direction in the stripe that will form the data encoding of the magnetic stripe. Transaction cards typically have their stripes encoded with account and/or other information in commercial magnetic stripe encoders prior to delivery to the consumer.

The process of magnetic tape application to transaction cards, the encoding of the magnetic stripe and the reading of the encoded data in the magnetic stripe at point of use has been a reliable and cost effective method for portable personal data storage for financial, ID and other transaction card based applications. However, the relative ease of reading and encoding or re-encoding of the magnetic stripe data has made the magnetic stripe transaction card subject to counterfeiting, copying the data to one or more cards (often referred to as "skimming") and other fraud abuses. Skimming fraud alone is growing around the world and has reached financial dollar losses that call for immediate solutions.

There are many security problems with conventional transaction cards. For one, the stripe is static and is not encrypted, allowing transaction card thieves to "steal", in the virtual sense, the data from the stripe and use it for unauthorized transactions. This is because with conventional magnetic stripe cards the transaction data is "exposed", i.e. not encrypted. If 'picked off', the data can be used indistinguishably in a counterfeit transaction card. As such, a counterfeit transaction card can be freely used by a thief until it is cancelled.

The skimming and counterfeiting problem has been partially addressed by MagTek Incorporated with its MagnePrint technology. MagnePrint® is a card security technology that can detect "skimmed" or magnetically altered counterfeit cards. Just as fingerprints can uniquely identify human beings, MagnePrint® can uniquely identify magstripe cards. MagnePrint® technology was discovered at Washington University in St. Louis, Mo., USA. MagTek refined the technology, to bring it to practical use, and has an exclusive license to market this technology. However, MagnePrint technology requires modified card readers for its implementation, which would render obsolete millions of legacy card readers.

In addition to a lack of security, conventional transaction cards are also quite limited in storage capacity. That is, conventional cards are limited to their stripe for storage. As such, conventional cards are not electronic cards, e.g. cards with embedded electronics such as an on-board processor and/or digital memory, and are very limited in their functionality.

An example of an electronic card is the so-called "Smart Card", which includes both an on-board processor and digital memory. By providing an on-board electronics, a Smart Card can implement security protocols such as encryption, store large amounts of user information, etc.

A common standard for Smart Cards is referred to as the ISO 7816 standard. With this protocol, a Smart Card is provided with an electrical interface including a number of electrically conductive and externally accessible contact pads which are coupled to an embedded secure processor. The Smart Card is inserted into a Smart Card reader which makes electrical contact with the contact pads to provide power to and communications with the secure processor. Smart Cards, however, are not provided with embedded power, e.g. a battery. Smart cards can also include a conventional stripe which, in the prior art, does not in any way interact with the secure processor.

Smart cards using memory chips and microprocessor chips were first introduced to provide increased data storage and to guard against some of the types of fraud found in magnetic stripe transaction cards. The Smart Cards do reduce some types of fraud but the cards are much more expensive than a magnetic stripe transaction card and the magnetic stripe readers at the point-of-transaction had to be replaced with readers that could read the data storage chip and the magnetic stripe. These cost factors and inertia in changing the existing infrastructure built up around the magnetic stripe transaction card systems and applications (e.g. "legacy" card readers) have prevented the rapid and more general acceptance of Smart Cards in the United States.

Another factor in the slow acceptance of Smart Cards in the United States, has been the lack of visible benefits to the end user or consumer. The consumer is just as content to use the magnetic stripe as to use the chip to complete a transaction.

While broadly adopted abroad, Smart Cards have not been extensively adopted in the U.S., as noted above. As noted above, a major reason for this is the investment made by millions of merchants in legacy card readers, which cannot communicate with the secure processors of Smart Cards. Also, Smart Cards conforming to the ISO 7816 standard suffer from their own limitations, including severely restricted 1/0, an inability to provide "smart" transactions with legacy card readers, etc.

Another limitation of smart cards in general is that they lack the ability to interact with a user when they are not in contact with a smart card reader. This limitation is due to the fact that the smart card of the prior art does not have an on-board power supply. Thus the electronic components lie dormant and do not allow for interaction. This limitation prevents a myriad of features, such as account selection, or a security feature to lock the card, etc.

Another suggested approach, not yet in use, uses a general processor and a stripe emulator which work with legacy card readers. As used here, the term "stripe emulator" will refer to a transaction card where data transmitted to a legacy card reader is under the control of the general processor. This approach will be referred to herein as an "emulator card", which is one form of an electronic card.

Emulator cards potentially have a number of distinct advantages over conventional credit cards. For one, a single card can emulate a number of different transaction cards, greatly reducing the bulk in one's wallet. For example, an emulator card can emulate a Visa card, a MasterCard, and an ATM card. Also, since the emulator card includes a processor, it is possible to implement additional functionality, such as security functions.

However, emulator cards, too, have their limitations. For one, since general processors are used the security level of the card is reduced. For example, a hacker could potentially obtain data stored in unsecured electronic memory. Also, emulator cards do not-address Smart Card protocols, as they are designed to work with legacy card readers. For example, as with conventional credit cards, data flows from the emulator card to the legacy card reader, and not vice versa. Still further, the information that can be provided by the emulator card is limited to the amount of information that a conventional stripe can hold and that a legacy card reader can read.

The need for fraud reduction with a versatile and inexpensively manufactured electronic card is urgent. In the U.S., fraud is tending to cover from 7.5 to 12 basis points in credit card transactions, and skimming alone is estimated to cost $8 billion dollars in 2005. Internationally, the need is even more dire, with fraud tending from 25 to 40 basis points, with 60 percent of that being due to skimming. Nevertheless, merchants in the United States and elsewhere are reluctant to invest the resources necessary to change all of their current magnetic-card transaction equipment for various reasons, including cost, inconvenience, disruption and lack of reliability.

There are other uses for electronic cards other than for financial transactions. For example, electronic cards have been used for security purposes to allow, for example, personnel to high security areas of a building ("access control"). Electronic cards can therefore be used for a variety of purposes where the identity and/or status of the bearer needs to be verified by a physical card or "token."

Electronic cards, as noted above, tend to be relatively expensive compared to conventional, non-electronic, magnetic stripe cards. This is due, in part, to the cost of the electronic components and is due, in part, to the complexity of manufacture of electronic cards. For example, care must be taken during lamination of electronic cards that the heat and/or pressure do not damage the sensitive electronic components. Also, electronic cards should remain thin, flexible and preferably of the same dimensions as conventional cards. As another example, stripe emulators tend to be difficult to design and manufacture such that they work with legacy readers.

Furthermore, powering the electronic circuitry of electronic cards tends to be problematical. For example, Smart Cards are powered by their readers, limiting their usefulness in non-contact applications. A good solution for powering ubiquitous electronic cards has not been found in the prior art.

These and other limitations of the prior art will become apparent to those of skill in the art upon a reading of the following descriptions and a study of the several figures of the drawing.

A number of non-limiting examples of electronic cards which address aforementioned problems and limitations of prior transaction cards and electronic cards are presented. As will be apparent to those skilled in the art, the methods and apparatus as disclosed herein are applicable to a wide variety of problems which require or could be improved with improved electronic cards.

In an embodiment, set forth by way of example rather than limitation, an electronic card includes a thin, flat digital processor, a thin, flat electrochemical battery, a communications port, a first flexible cover, and a second flexible cover. The digital processor preferably has a first substantially planar surface and a substantially opposing second substantially planar surface, wherein at least one of the first surface, the second surface, and a cross-section of the processor define a maximum surface area. The battery preferably has a first substantially planar surface and a substantially opposing second substantially planar surface, wherein at least one of the first surface, the second surface, and a cross-section of the processor define a maximum surface area, the battery being positioned substantially co-planar with the processor and capable of powering the processor. The communications port is coupled to the processor. Each of the first flexible cover and the opposing second flexible cover have a surface area greater than the combined maximum surface areas of the digital processor and the battery. The processor and the battery are sandwiched between and enclosed by the first flexible cover and the second flexible cover.

In an exemplary embodiment, the electronic card includes a flexible circuit board. In another exemplary embodiment at least one of the first cover and the second cover are contoured to fit over the circuit board, processor and battery. In another exemplary embodiment, one or more switches are coupled to the circuit board. In another exemplary embodiment, one or more indicators are coupled to the circuit board. In another exemplary embodiment, the processor is coupled to the circuit board in a flip-chip fashion. In another exemplary embodiment, the processor is coupled to the circuit board with bonded wire. In another exemplary embodiment, the bonded wire has a low loop height. In another exemplary embodiment, the processor is encapsulated against the printed circuit board. In another exemplary embodiment, the battery includes two or more batteries. In another exemplary embodiment, the battery is not rechargeable. In another exemplary embodiment, the battery is rechargeable. In another exemplary embodiment, the battery includes a rechargeable battery and a non-rechargeable battery. In another exemplary embodiment, the battery is part of a power supply including a power filter.

In an embodiment, set forth by way of example rather than limitation, a method for making an electronic card includes making a flexible printed circuit board, attaching at least one processor to the printed circuit board, coupling at least one battery to the printed circuit board, encapsulating at least the one processor, making a top cover and a bottom cover; and sandwiching the printed circuit board, the processor and the battery between the top cover and the bottom cover.

In an embodiment, set forth by way of example rather than limitation, an enhanced Smart Card includes a card body provided with an externally accessible card interface including a signal port, a power port, and a ground port, a secure processor disposed at least partially within the card body and coupled to the signal port, the power port, and the ground port, a general processor disposed at least partially within the card body, the general processor being coupled to a power source disposed at least partially within the card body and being operative to provide power to and communicate with the secure processor when the secure processor is being used in an enhanced Smart Card mode; and a non-contact communications port coupled to at least one of the secure processor and the general processor.

In an embodiment, set forth by way of example rather than limitation, a secure transaction card includes a card body, a secure processor disposed at least partially within the card body, a general processor disposed at least partially within the card body, a power source disposed at least partially within the card body; and a non-contact communications port coupled to at least one of the secure processor and the general processor.

In an embodiment, set forth by way of example rather than limitation, a swipe emulating broadcaster system includes a coil having an elongated core material and a winding having a plurality of turns around the core material; and a signal generator having a broadcaster driver signal coupled to the coil such that the coil provides a dynamic magnetic field which emulates the swiping of a magnetic stripe transaction card past a read head of a card reader.

In an exemplary embodiment, the signal generator includes a processor having a digital output and a signal processing circuit which converts the digital output to the broadcaster driver signal. In another exemplary embodiment, the signal generator is a digital signal generator. In another exemplary embodiment, the coil is one of a plurality of coils. In another exemplary embodiment, at least one of the plurality of coils is a track coil. In another exemplary embodiment, at least one of the plurality of coils is a cancellation coil. In another exemplary embodiment, the coil includes a wire wound around the core. In another exemplary embodiment, the coil includes a wire formed around the core by a process including at least the deposition of conductive material and the etching of the conductive material.

In an embodiment, set forth by way of example rather than limitation, a method for creating a low-loop bonding for thin profile applications includes attaching a first surface of a fabricated semiconductor die to a first surface of a substrate having a plurality of substrate contact pads, such that a second surface of the die which opposes the first surface is exposed to provide access to a plurality of die contact pads, wire bonding a first end of a wire to a substrate contact pad; and wire bonding a second end of the wire to a die contact pad, such that the loop height of the wire is no greater that 5 mils above the second surface of the die, and no greater than 20 mils above the first surface of the substrate.

These and other embodiments, aspects and advantages will become apparent to those of skill in the art upon a reading of the following descriptions and a study of the various figures of the drawing.

BRIEF DESCRIPTION OF THE DRAWINGS

Several exemplary embodiments will now be described with reference to the drawings, wherein like components are provided with like reference numerals. The exemplary embodiments are intended to illustrate, but not to limit. The drawings include the following figures:

FIG. 6 is a top plan view of an exemplary printed circuit (PC) board of an exemplary electronic card;

FIG. 8 is an exploded, partially cross-sectional view of an exemplary electronic card;

FIG. 9 is partially cross-sectional view of the electronic card of FIG. 8 after it has been assembled;

FIG. 10 illustrates an exemplary wire bond connection between a processor and a PC board;

FIG. 11 illustrates an exemplary broadcaster slot with alignment marks;

DETAILED DESCRIPTION OF EXEMPLARY EMBODIMENTS

As noted, there are a great many applications for electronic cards. One of many applications is to provide security for financial transactions, e.g. financial transactions using transactions cards such as credit cards and debit cards. In the following exemplary embodiments, particular emphasis will be placed on transaction card security, with the understanding that other uses for enhanced electronic security, such as, but not limited to, access control, are within the true spirit and scope of the invention.

Figure 1:
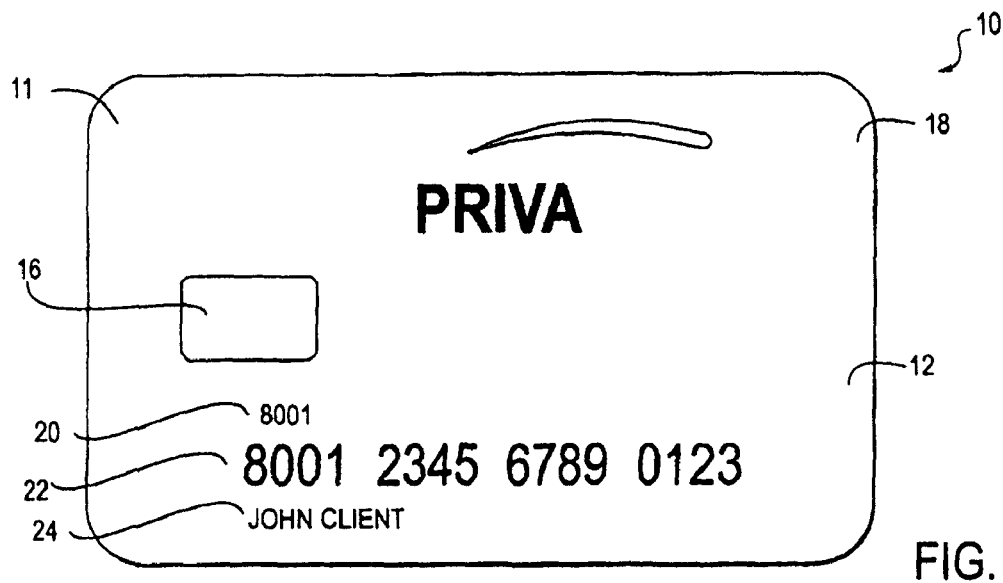
FIG. 1 is a top plan view of an exemplary electronic card.

FIG. 1 is an embodiment of an electronic card 10, set forth by way of example but not limitation, which includes a card body 11. The card body may be made from a thermoplastic material, such as polyvinylchloride (PVC) in exemplary embodiments, but other materials with sufficient flexibility and durability are also suitable. For example, other thermoplastics can be used, as well as thin metal (e.g. stainless steel). Of course, if a conductive material is used for the card body 11, adequate electrical insulation from the electrical and/or electronic components must be maintained. Still other materials, such as resins, carbon fibers, organic and non-organic materials, etc. are also suitable for various alternate embodiments. In summary, card body 11 can be made from any suitable material which is strong enough and durable enough to be used as a transaction card.

The exemplary electronic card 10 has a front surface 12 which is provided with an electrical interface 16. This is one non-limiting example of a communication port for the electronic card 10. In other embodiments, the interface 16 may be eliminated, or additional communication ports may be provided.

The illustrated electrical interface 16 includes a number of contact pads which, in this example, are formed in a configuration which is compliant with the International Standards Organization "Smart Card" standard ISO 7816, incorporated herein by reference. In this exemplary embodiment, the electronic card is usable as a legacy mode Smart Card. Also shown on the front surface 12 is an institution identifier 18, an institution number 20, an account number 22, and a client name 24. The account number is preferably embossed on the electronic card 10 to provide raised numerals for credit card imprint machines.

Figure 2:
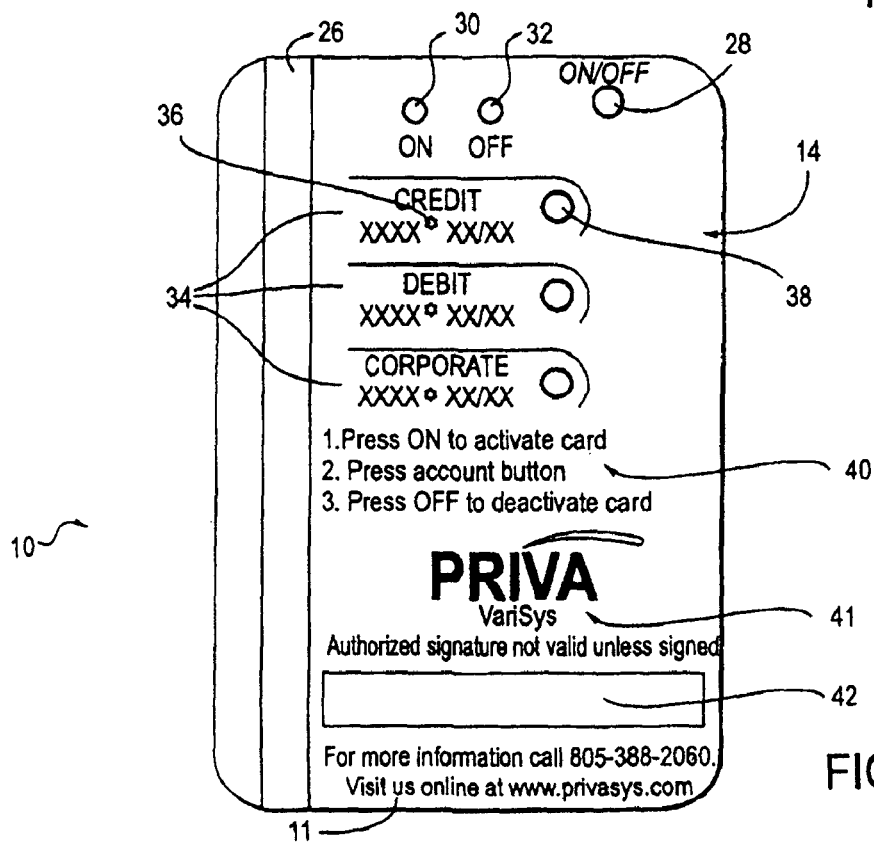
FIG. 2 is a bottom plan view of the exemplary electronic card of FIG. 1.

FIG. 2 illustrates a back surface 14 of the exemplary electronic card 10. In this exemplary embodiment, a magnetic stripe emulator 26 is provided on the back surface 14 which can be used to communicate with legacy magnetic stripe readers of the prior art. The stripe emulator 26 is therefore another non-limiting example of a communications port.

The electronic card may also have, for example, an on/off button 28, an "on" indicator 30, and an "off" indicator 32. In this exemplary embodiment, "on" indicator 30 may be a green LED and the 'off' indicator 32 may be a red LED. Also seen on the exemplary card back 14 are a plurality of account interfaces 34. Each account interface 34 preferably has account indicator LED 36 and an account selector switch 38. Each account interface 34 may also have, for example, printed information identifying the account and expiration date. Back surface 14 also has, in this example, instructions 40, an institution identifier 41, a signature box 42, and various other printed information.

Figure 3:
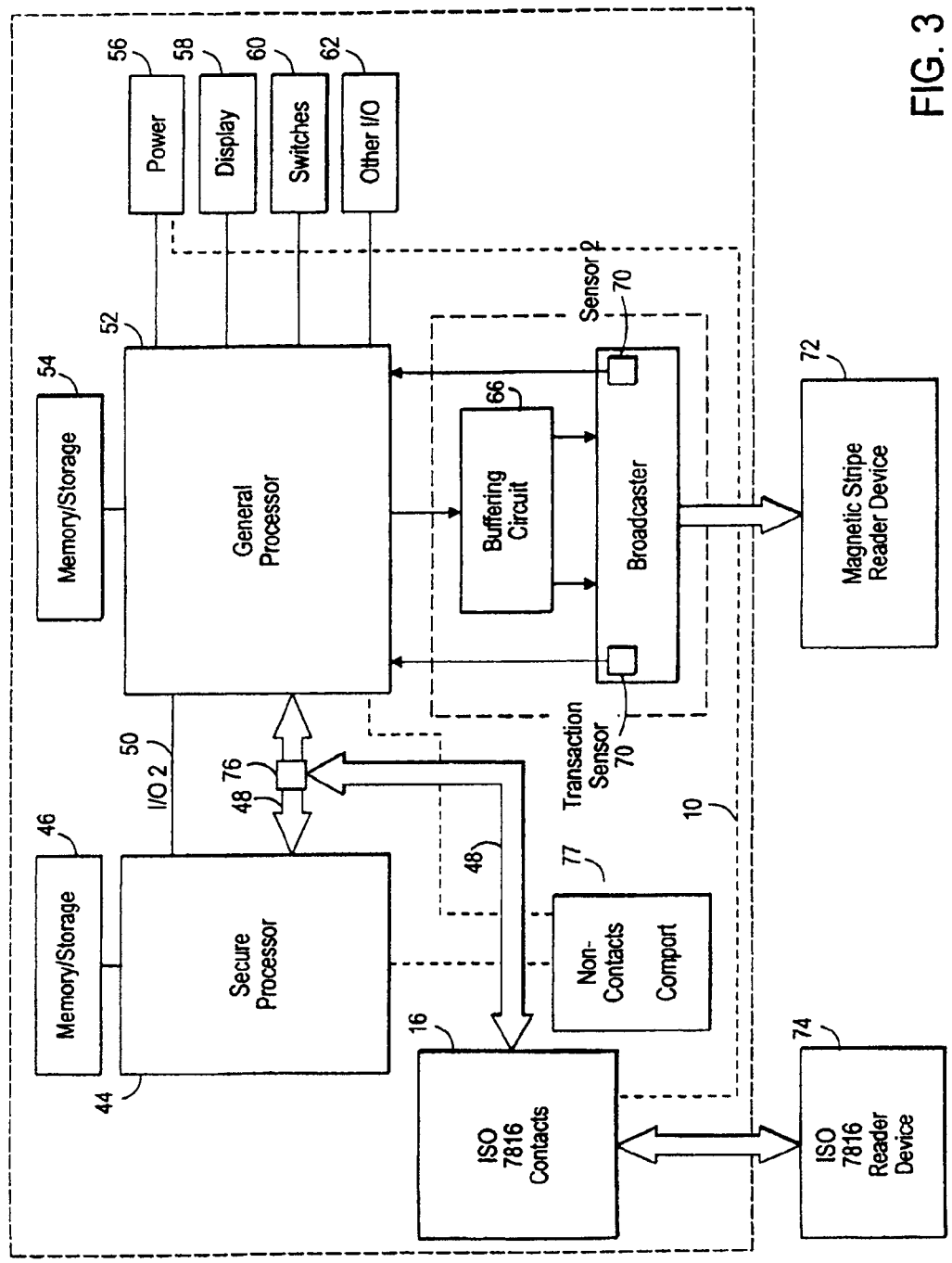
FIG. 3 is a block diagram of an exemplary circuit for the electronic card illustrated in FIGS. 1 and 2.

FIG. 3 is a block diagram, presented by way of example but not limitation, of the circuitry of exemplary electronic card 10. In this example, the electronic card 10 includes a secure processor 44, a general processor 52, and a magnetic stripe emulator 64. In this embodiment, both the secure processor 44 and the general processor 52 are coupled to the ISO 7816 interface 16 by a bus 48.

Secure processor 44 is preferably a commercially available Smart Card chip which has various tamper resistant properties such as a secure cryptographic function and tamper resistant storage 46. An exemplary embodiment of secure processor 44, given by Germany. Similar devices are manufactured by Hitachi, Infineon, Toshiba, ST and others. As noted previously, in this example secure processor 44 is connected electrically to the interface 16 by a bus 48.

General processor 52 is, in this example, also connected to the bus 48 and, therefore, to both the secure processor 44 and the interface 16. Additionally, in this example, the general processor 52 is coupled to the secure processor 44 by an "I/O 2" line 50. In the current exemplary embodiment, memory 54 is coupled to the general processor 52. General processor 52 is also coupled, in this example, to power source 56, display 58, switches 60, and other I/0 62.

In an alternate embodiment, general processor 52 communicates with the secure processor 44 in an ISO7816 compliant mode over the bus 48. In such an embodiment, no other connection to the secure processor is required (e.g. the I/O 2 line 50 connection can be omitted).

Power source 56 is preferably an electrochemical battery disposed within the card body 11. It may be either a non-rechargeable battery or a rechargeable battery. If power source 56 is a non-rechargeable battery, it should have sufficient capacity to power the electronic card 10 for its useful life. If the power source 56 is rechargeable, the electronic card 10 may be used indefinitely. A rechargeable battery may, for example, be recharged through interface 16, by magnetic induction (e.g. through an induction coil or the broadcaster coils), a photovoltaic cell embedded in body 11, a piezoelectric material embedded in the electronic card 10, another electrical connector, kinetic recharging mechanisms (e.g. magnets and coils), or other suitable mechanisms. For example, in some situations a rectification of ambient RF energy may provide sufficient energy to power the electronic card 10, recharge a battery, or store supplemental charge in, for example, a capacitor.

Alternative exemplary embodiments include both a primary and a secondary battery disposed within the card body. For example, a non-rechargeable battery could serve as a primary battery and a rechargeable battery could serve as a secondary battery, or vice versa. These exemplary embodiments are given by way of example and not limitation.

Since the power source 56 is embedded in the electronic card 10, it must be thin. This is because the electronic card 10, for many applications, must be able to bend within certain ranges. For example, an electronic card 10 used for transaction card applications must conform to the ISO 7810 standard, which is 85.60 mm (−3370 mils) wide, 53.98 mm (−2125 mils) tall, and 0.76 mm (−30 mils) thick. This is often referred to as the "CR80" format, which is roughly 3½" by 2", and fits well into a standard wallet. However, other formats can also be used which are larger, small, or differently configured than the CR80 format. By way of non-limiting example, an electronic card of smaller than CR80 dimensions can be made to fit on, for example, a keychain.

The cards must be somewhat flexible so that they can be used in, for example, insertion-type legacy card readers, so it is also preferable that the power source be somewhat flexible if it is relatively large in surface area. However, flexibility is not a problem if the battery is relatively small in surface area, or if several smaller batteries are coupled together to form the power source 56. Also, it is important that the power source 56 can withstand heat and/or pressure if, for example, heat and/or pressure lamination techniques are used to manufacture the electronic card 10.

Examples of suitable batteries are manufactured by Varta Microbattery of Ellwangen, Germany and Solicore of Lakeland, Fla. The batteries are preferably electrochemical in nature, although other types of batteries or capacitive storage devices can also be used. Suitable electrochemical batteries can include, by way of example but not limitation, Li-polymer, Ni-MH, lithium, lithium-ion, alkaline, etc.

General processor 52 may be, for example, a PIC 16 or PIC 18 microcontroller. In an alternative embodiment, general processor 52 may comprise an ASIC chip. In still further embodiments, general processor may be any form of logic (e.g. a state machine, analog processor, etc.) which performs the desired processing functions.

Display 58 may include, for example, LED devices as disclosed previously. As another non-limiting example, display 58 is may comprise an LCD display. The LCD display is preferably flexible if it is of a relatively large surface area. Switches 60 can be any form of electrical switches or devices which provides the functionality of switches to provide inputs or controls for the electronic card 10. The processor 52 may, for example, provide software debouncing algorithms with respect to such switches. Other I/O 62 may comprise any number of alternative I/O subsystems. These may include, by way of example and not limitation, audio, tactile, RF, IR, optical, keyboard, biometric I/O or other I/O. The secure processor 44 may also provide I/O by RF or IR in accordance with ISO 7816 standards.

Also coupled to general processor 52, in this exemplary embodiment, is magnetic stripe emulator 64, which allows the electronic card 10 to be used in a mode which emulates a magnetic stripe card of the prior art. Magnetic stripe emulator 64, in this non-limiting example, is comprised of a buffering circuit 66, which converts digital output from general processor 52 into a wave form appropriate for magnetic stripe emulation. In this exemplary embodiment, buffering circuit 66 includes a conversion circuit which is typically implemented as an RC network. Along with the broadcaster, the RC network forms an RCL network to condition the waveform. RC networks and their equivalents are well known to those skilled in the art.

In this example, magnetic stripe emulator 64 further includes a broadcaster 68. As used herein, the term "broadcaster" refers to one or more inductive coils which are used to "broadcast" a fluctuating magnetic signal which emulates the movement ("swipe") of a transaction card's stripe past the read head of a magnetic card reader.

Broadcaster 68 may be electrically coupled to buffering circuit 66 and referably receives two tracks of signal which are converted by broadcaster 68 into magnetic impulses for magnetic stripe emulation. Alternative embodiments include one, three, four or more tracks. Broadcaster 68 may include one or more electrical coils to convert electrical signal into magnetic impulses.

Broadcaster 68 of this example may further include one or more sensors 70, which are electrically coupled to general processor 52. These sensors are used to signal to general processor 52 that the physical act of swiping the card body 10 through a legacy card reader has commenced. Sensors 70 also communicate to general processor 52 when contact is lost with the magnetic stripe reader 72, which receives and interprets magnetic flux impulses from the broadcaster.

As noted previously, the electronic card 10 of this example includes an electrical interface 16. In this example, electrical connectors 16 are used in a manner compliant with ISO 7816 to communicate with an ISO 7816 reader device 74. That is, electronic card 10, in this example, can be used as a legacy Smart Card or as a legacy magnetic stripe transaction card.

When used in a legacy Smart Card mode, secure processor 44 is powered by bus 48 from a Smart Card reader device 74. The reader device 74 can be used to program and personalize secure processor 44 with various information including, by way of example and not imitation, firmware code, account numbers, cryptographic keys, PIN numbers, etc. This information, once loaded into secure processor 44, prepares secure processor 44 for an operational mode which no longer requires the use of reader device 74.

In this "independent" mode, secure processor 44 communicates with general processor 52 and provides services such as cryptographic functions and the dynamic generation of authentication information which is used to communicate via general processor 52 and magnetic stripe emulator 64 with magnetic stripe reader 72. Also in this example, the authentication code may be used only once for a single transaction. Subsequent transactions require new authentication codes to be generated. Secure processor 44 can also send account information and/or DACs via RF and IR.

In an alternative embodiment, the card body 10 continues to be used with reader device 74 and also with magnetic stripe reader device 72. In this alternate embodiment, the card detects the mode in which it is being used and automatically switches the usage of bus 48 appropriately for the detected mode of operation. This is achieved in optional bus arbitrator 76. In other embodiments, there is no bus arbitrator 76. Optional bus arbitrator 76 can detect when it is being used with reader device 74 because power is provided by reader device 74 via electrical connectors 16 to bus 48. Similarly, optional bus arbitrator 76 can detect that power is being provided by general processor 52 and switch to the corresponding mode of operation, which services general processor 52 and the various I/O devices connected thereto. In yet another alternative embodiment, optional bus arbitrator 76 allows for the dynamic communication of both general processor 52 and secure processor 44 with each other respectively, and with reader device 74. This requires bus arbitration logic which is well known to those skilled in the art. In a further alternative embodiment, general processor 52 is interposed between secure processor 44 and electrical connectors 16. In this alternative embodiment, general processor 52 acts as a "go-between" or a "front end" for secure processor 44.

With continuing reference to FIG. 3, an exemplary non-contact communications port 77 may be included as an alternative to or in addition to exemplary communication ports 16 and 64. That is, non-contact communications port 77 may be provided to allow communications without physical contact with a reader.

Non-contact communications port 77 can be a radio frequency communications port, IR communications port, or any other form of communications which does not require physical contact. Of course other embodiments may be provided with contact communications ports, such as communications port 16 and broadcaster. That is, these embodiments are described by way of example and not limitation.

A standard for radio frequency ("RF") communication for Smart Card communications is ISO/IEC 14443, dated 2001, incorporated herein by reference. It includes an antenna and RF driver characteristics and defines two types of contactless cards ("A" and "B"), allows for communications at distances up to 10 cm. There have been proposals for ISO 14443 types C, D, E and F that have yet to complete the standards process. An alternative standard for contactless smart cards is ISO 15693, which allows communications at distances up to 50 cm.

Figure 4:
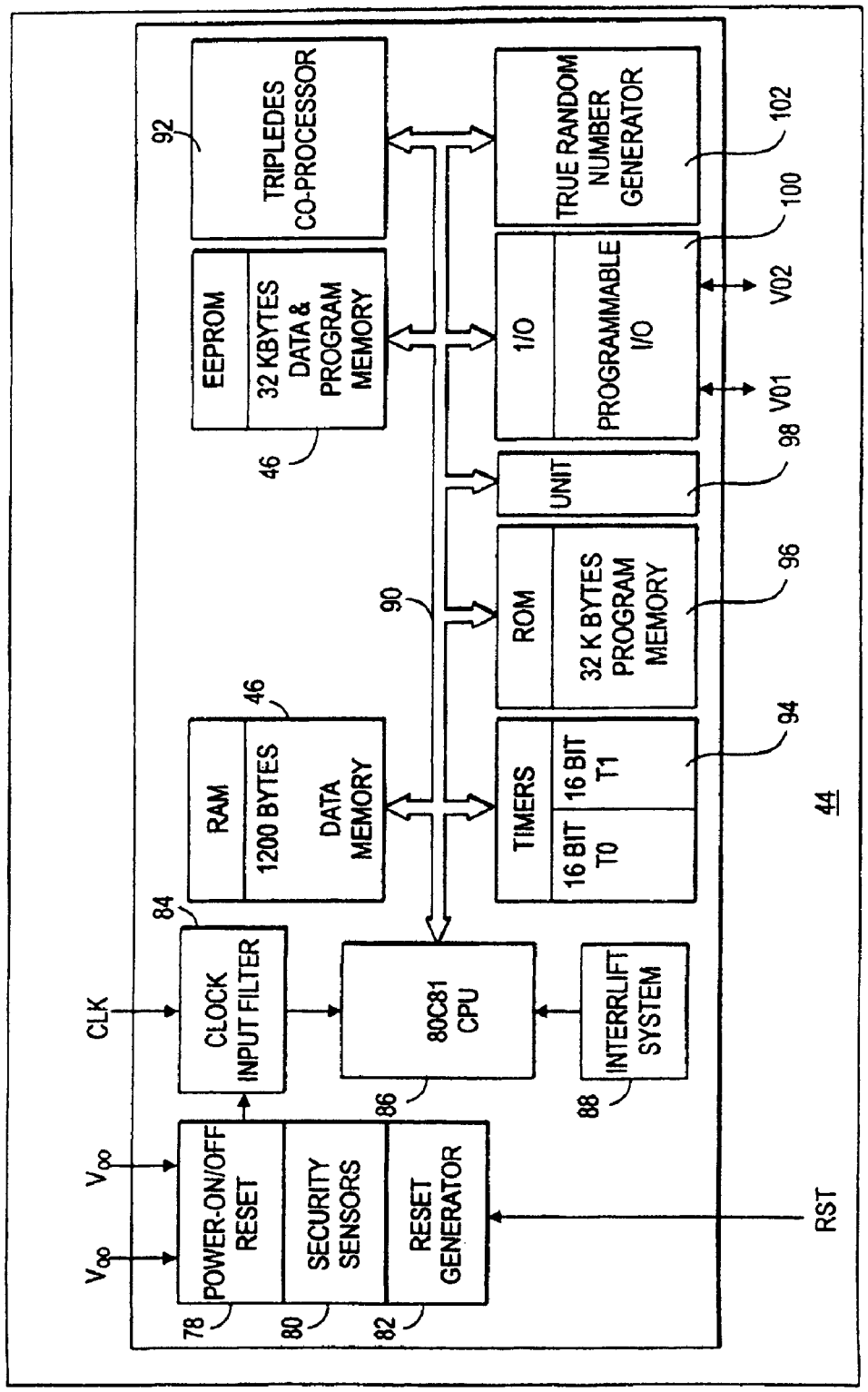
FIG. 4 is a block diagram of an exemplary secure processor of FIG. 3.

FIG. 4 illustrates exemplary secure processor 44 of FIG. 3 in greater detail. Secure processor 44 of this example is an ISO 7816 compliant microcontroller comprising power switch 78, security sensors 80, reset generator 82, clock input filter 84, CPU 86, interrupt system 88, and internal bus 90. Coupled to internal bus 90 is tamper resistant storage 46, which may be comprised of RAM, EEPROM, etc. Also coupled to bus 90 is co-processor 92, which handles encryption and decryption. In this exemplary embodiment, the co-processor 92 performs TRIPLE-DES encryption and decryption. Also coupled to bus 90 are timers 94 and ROM 96, which is used, for example, for storing firmware for secure processor 44, UART 98, which is used for serial communications. Also connected to bus 90 is I/O subsystem 100 and random number generator 102.

Secure processors 44 as described above are commercially available from a variety of sources including Philips, Hitachi, Infineon, Toshiba, ST, and others. A suitable secure processor 44 for use in the disclosed exemplary embodiment is the model P8WE6032 processor made by Philips of Germany. In certain alternate embodiments, the secure processor 44 can be replaced by a general processor.

Figure 5:
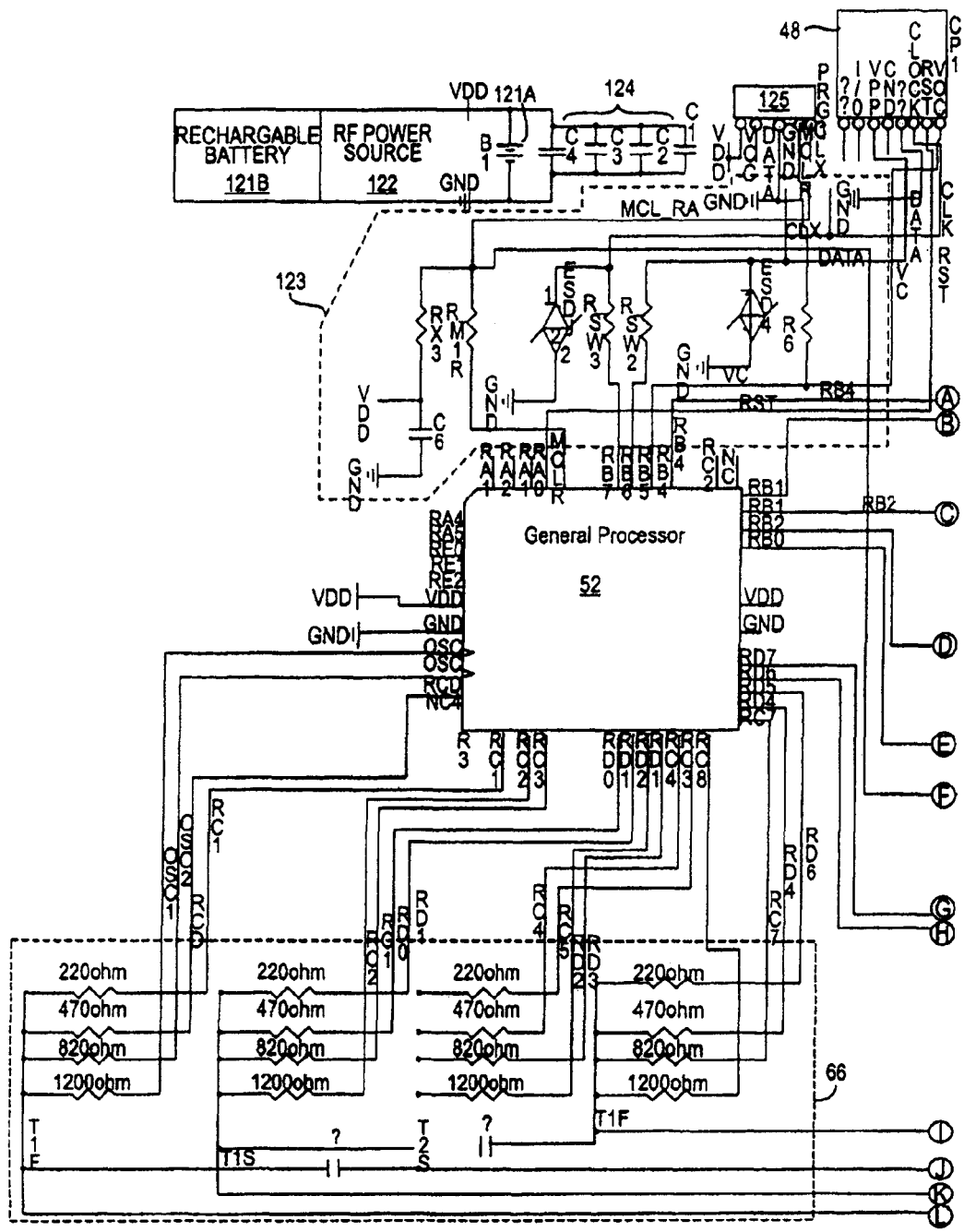
FIG. 5 and FIG. 5A are schematic diagrams of an exemplary embodiment of a general processor of FIG. 3 and exemplary associated 1/0 devices and subsystems.
Figure 5A:
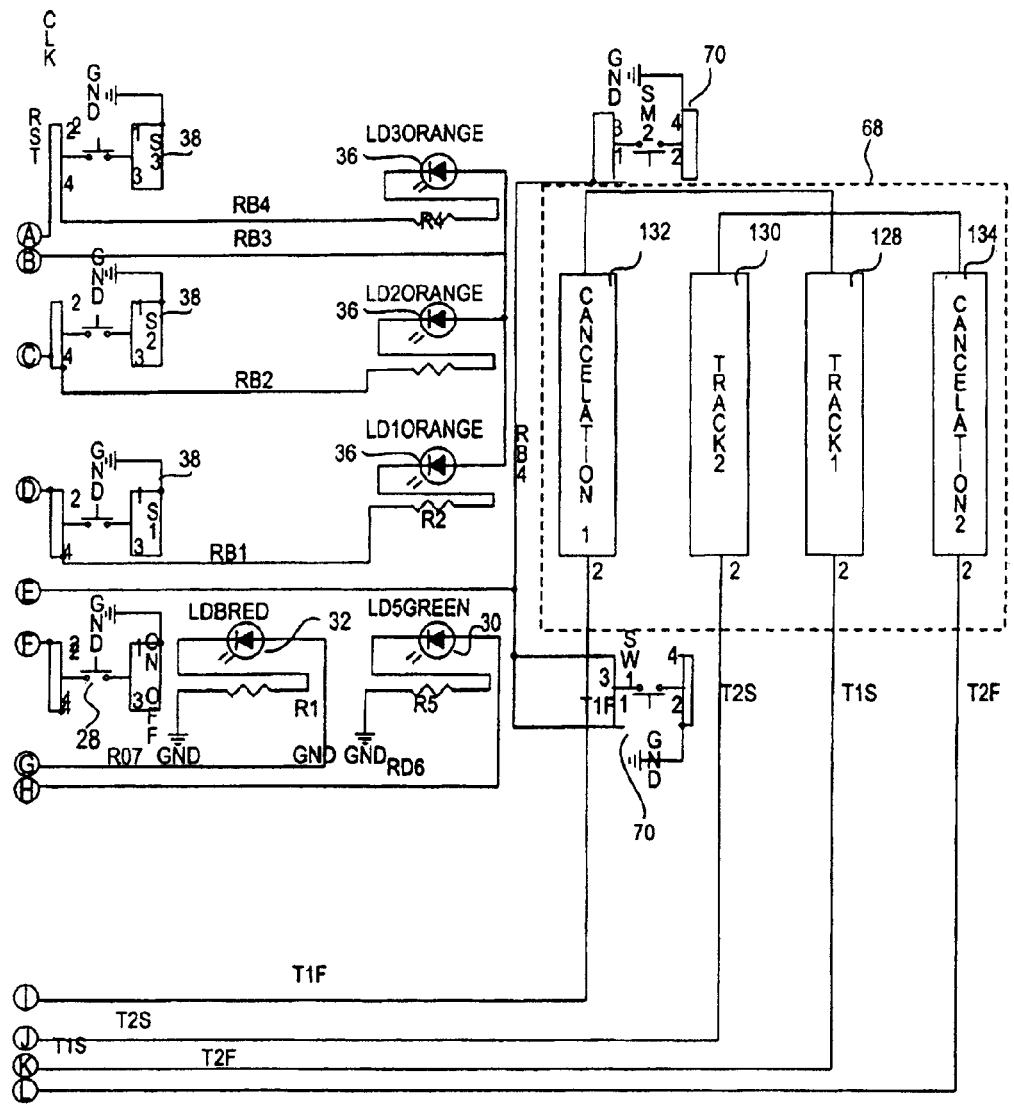

FIG. 5 is a schematic of general processor 52 coupled its associated I/O devices subsystems set forth by way of example and not limitation. As noted above, general processor 52 may be a PIC 16 or PIC 18 microcontroller. For example, the general processor 52 can be a Microchip LF 77 PIC 16 or Microchip LF 4530 PIC 18. Alternatives are provided bye Texas Instruments, Atmel, and others. Other general processors may also be used and, in certain alternate embodiments, the general processor 52 can also be a secure processor.

In this exemplary embodiment, two electrochemical batteries 121A and 121 B are shown. As noted, batteries of suitable chemistries and dimensions are commercially available from, for example, Varta Microbattery GmbH. In this example, non-rechargeable battery 121 A serves as a primary battery, while rechargeable battery 121B serves as a secondary battery. Battery 121B may be coupled to a recharging apparatus 122, which is shown here as an RF power source. Of course, the induced current is rectified prior to being applied to the battery 121 B. As noted above, there are a number of other suitable recharging apparatus that will be apparent to those skilled in the art.

Preferably, capacitor assembly 124 is provided in order to provide a smooth source of power without peaks or power dropouts. The capacitor assembly can include one or more capacitors, as illustrated. Capacitor assembly 124 may also be used to smooth the power from a rectifier which may be present in recharging apparatus 122. Battery 121A, battery 121B, recharging apparatus 122, and capacitor assembly 124 are all part of power source 56 of FIG. 3 in this exemplary embodiment.

One or more capacitors, such as the capacitor assembly 124, can also be used as a charge storage device. That is, -a "super capacitor" having a sufficiently high capacitance can significantly supplement the current provided by the electrochemical battery in certain embodiments. For example, a capacitance range of about 1 uF+−10% @ 6.3 v is suitable in some embodiments to serve as a super capacitor. This relatively large capacitor assembly 124 can be conveniently accomplished, for example, by using ten 0.1 uF capacitors connected parallel in order to reduce the size and height of the capacitor.

With continuing reference to FIG. 5, a temporary port 125 may provided to assist in the manufacturing process. Optionally, it is provided on a part of a printed circuit board that is removed once the manufacturing operations requiring its use are completed. Temporary port 125 may be used, for example, to load data and programs into general processor 52 and associated EEPROM as well as secure processor 44 and its associated EEPROM. Components 123 may be provided to ensure that the electrical connections to general processor 52 have appropriate electrical characteristics, are free of power spikes or power dropouts, etc.

General processor 52 is, in the present example, connected to a number of switches including on/off switch 28 and account selector switches 38. Also connected to general processor 52 are a number of light emitting diodes ("LEDs") including a "power-on" indicator 30, a "power-off" indicator 32, and "account-on" indicators 36. These various LED's and switches comprise a human/computer interface with the electronic card 10. Of course, there are many alternates or additions to the electronic card 10 and to devices communicating with the electronic card 10 which are also helpful human/computer interfaces. By way of further example but not limitation, the electronic card 10 may include an LCD screen (with or without a touch panel), audio I/O, voice recognition, and various other alternatives that will be apparent to those of skill in the art.

In this example, an RC buffering circuit 66 is coupled to general processor 52 and converts (in conjunction with the broadcaster 68 and/or other components) square wave type signals emanating from general processor 52 into wave forms which emulate the magnetic signals ("dynamic magnetic flux") provided by a magnetic stripe transaction card passing through a reader. Wave forms are communicated electrically to broadcaster 68 which converts the electrical signals into a dynamic magnetic field which simulates the passing of a card with a magnetic stripe through a magnetic stripe reader. The electronic card 10 may be moving or stationary, and the varying magnetic field broadcasted by the broadcaster 68 will emulate the varying magnetic field created by a magnetic stripe of a conventional transaction card moving past a read head. The magnetic signal created by the broadcaster therefore tends to be substantially uniform along its length.

Sensors 70 provide signals to general processor 52 to indicate that the card has made physical contact with the reader. Sensors 70 may take various forms including physical switches, pressure sensors or other alternatives which will be apparent to those of skill in the art. Broadcaster 68 achieves its waveform subsequent to the activation of one or more sensors 70.

Four exemplary coils 128, 130, 132 and 134 are shown in FIG. 5. More particularly, in this exemplary embodiment, the broadcaster 68 includes a "track one" coil 128, a "track two" coil 130, a "track one cancellation" coil 132 and a "track two cancellation" coil 134. In this exemplary embodiment, the track one coil 128 and the track two coil 130 are preferably positioned on the card for optimal contact with magnetic read head of magnetic stripe reader device 72 (see FIG. 3). That is, the track one coil 128 is preferably positioned equidistant from and interposed between the track two coil 130 and the track two cancellation coil 134.

Since the magnetic field from the track two coil 130 may interfere with the magnetic field of the track one coil 128, the track two cancellation coil 134 is provided to "cancel" this "cross talk" effect. By "cancel" it is meant that the cross talk is at least significantly reduced. The magnetic field generated by the track two cancellation coil 134 is the inverse of that of the track two coil 130 thus reduces the effect of the track two coil 130 magnetic field of track one coil 128. Similarly, the track two coil 130 is, in this example, equidistant from and interposed between track one coil 128 and track one cancellation coil 132. Reduction of the cross talk effect of the track one coil 128 is provided by the track one cancellation coil 132. The broadcaster coils 128-134 and sensors 70 comprise broadcaster 68 in this exemplary embodiment.

In an alternative embodiment, cancellation coils 134 and 132 are not provided, but rather, the electrical signals provided to these coils are modified in such a manner that the interfering magnetic fields provide appropriate magnetic input to magnetic stripe reader device 72. This may be achieved through the use of an ASIC, digital signal processor (DSP), or by other instrumentalities. Optionally, the positions of these two broadcaster coils 126 may be offset from their positions in the previously described embodiment to provide the appropriate effect. Alternatively, cancellation can be achieved through mechanical shielding with nano materials that could shield the broadcast data between the two adjacent coils. These various exemplary embodiments are given by way of example and not limitation. Alternatives to the embodiments shown in FIG. 5 will be apparent to those of skill in the art.

Furthermore, a digitally synthesized signal may be applied to the broadcaster 68 which could reduce or eliminate the need for signal conditioning circuitry such as the RC circuit and/or for the need for cancellation coils. The digitally synthesized signal may be accomplished, for example, in the general processor 52, in a DSP, or in other circuitry, as will be appreciated by those skilled in the art.

FIG. 6 is a top plan view of an exemplary printed circuit (PC) board 136. Preferably, PC board 136 is a "flex" board so that the electronic card 10 is compliant with the aforementioned ISO 7810 standard for flexibility. PC board 136 is provided with conductive traces, such as traces 137, and supports various electronic components such as processors 44 and 52. The PC board 36 also provides space for the broadcaster 66 and one or more electrochemical batteries 121. This exemplary embodiment is provided by way of example and not limitation.

As noted previously, the thickness (or height, when the card is taken in cross-section) for an electronic card 10 made to ISO 7810 standard dimensions is only about 30 mils. Therefore, it is important that the various internal components of the electronic card 10 be thin, flat, and substantially coplanar. By way of example and not limitation, the digital processor 52 should be thin and flat, with a first substantially planar surface and a substantially opposing second substantially planar surface. It should also define a first maximum surface area. By way of further example but not limitation, the electrochemical battery 121 should have a first substantially planar surface and as substantially opposing second substantially planar surface, and should define a second maximum surface area. A theoretical plane through the center of the digital processor 52 should be substantially coplanar with a theoretical plane through the center of battery 121 so that the desired thinness of the electronic card 10 may be achieved.

The word "substantially" is used herein to mean approximately. For example, a substantially planar surface is at least approximately flat. Minor imperfections, steps, bumps or curvatures to the major surfaces are still considered to be "substantially planar", and do not have to be applied to the entire surface. "Substantially opposing surfaces" are generally facing each other and are at least approximately parallel.

By "substantially co-planar" it is meant that theoretical center planes are at least close together and approximately parallel. Of course, the center plane of processor 52 could be above or below the center plane of battery 121 and the two components could still be considered "substantially co-planar" as long as the desired thinness of the electronic card 10 can be maintained. For example, the processor 52 and battery 121 can still be considered coplanar as long as there is any plane generally parallel to the major surfaces of these components which intersects both of the components. If, for example, the battery 121 is 16 mils high and the processor 52 is 10 mils high in cross section, the center planes of the components could be separated by as much as 8 mils and they would still be considered to be "substantially co-planar."

Figure 7:
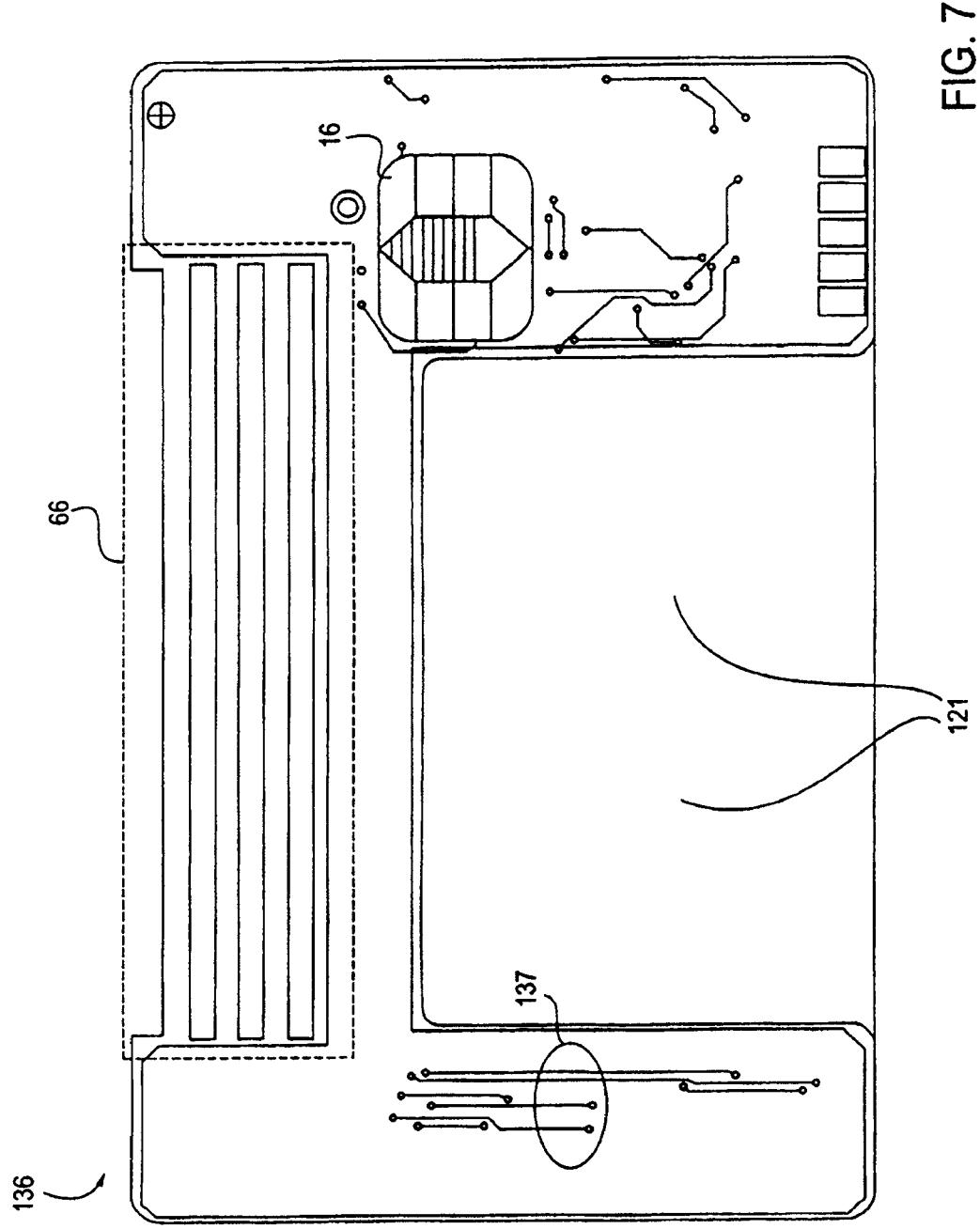
FIG. 7 is a bottom plan view of the PC board of FIG. 6.

FIG. 7 is a bottom plan view of exemplary PC board 136. PC board 136 is again provided with a number of traces 137, as well as space for the broadcaster 66 and batteries 121. Also shown is interface 16 which is geometrically positioned to coincide with the position of secure processor 44. These exemplary embodiments are given by way of example and not limitation.

PC board 136 may be, for example, a multilayer PC board. For example, the top of the PC board 136 as seen in FIG. 6 may be a first or top layer, and the bottom of the PC board as seen in FIG. 7 may be a second or bottom layer. The two layers may be adhered together, or there may be other intermediate layers. Each layer includes an insulating substrate made, for example, from a PVC material, and may include conductive traces, pads, and other structures. As noted above, it is desired that the PC board be flexible to help the electronic card meet the ISO 7810 standards for flexibility.

FIG. 8 is an exploded, partially cross-sectional view of electronic card 10. A bottom cover 140 has, in this example, a maximum height of about 25 mils. It should be noted that the bottom cover 140 is contoured on its upper surface 141 to fit the contours of the PC board, battery, and/or components attached to the bottom of the PC board or the like. The PC board 136, in this example, has a height of about 6 mils, which makes it thin and flexible. General processor 52 is shown mounted on PC board 136 and encapsulated by material 144 (e.g. an epoxy encapsulant). Also shown is secure processor 44 similarly encapsulated by material 144. Also mounted on PC board 136 are the various components of battery 121.

With continuing reference to FIG. 8, an exemplary embodiment of battery 121 has a height of 16 mils. Also shown in FIG. 8 is broadcaster 68 which coincides laterally with battery 121 in this embodiment and thus occupies the overlapping space in this cross-section diagram. Broadcaster 68 as shown in this exemplary embodiment has a height of about 20 mils. Also mounted PC board 136 are account selector switches 38, "on" indicator 30, and 'off' indicator 32. Account indicators 34 coincide laterally with on indicator 30 and, therefore, occupy overlapping space in this cross-section view. Cover 146 is shown with a height of about 5 mils. When assembled, the electric card 30 is therefore approximately 30 mils, which is ISO 7810 compliant. The exemplary embodiments shown in FIG. 8 are given by way of example and not limitation, and dimensions can vary, as will be appreciated by those of skill in the art.

FIG. 9 is a partial cross-sectional view of electronic card 10 after it has been assembled. The various exemplary components are shown with the various layers in compact form as with a finished electronic card 10. Covers 140 and 146 enclose and protect the electrical and electronic circuitry within the card. Preferably, an epoxy adhesive 147 is used to encapsulate the electrical and electronic components (other than those which must be exposed) and to hold the assembly together. The covers 140 and 146 may be composed of polyester or FR4 or various other materials, as described previously. The final assembly is a hermetically sealed electronic card 10 compliant with loop height of preferably less than 5 mils, more preferably less than 4 mils, and most preferably about 2 mils or less, 7-10 grams of pull-strength on the wire can be achieved.

FIG. 10 is a detailed elevational view of a wire bond connecting a processor die 56 to PC board 136. This exemplary embodiment allows for a low profile as is advantageous due to the severe size constraints imposed by the thickness standards for electronic card 10. Die 56 is mounted on PC board 136 using an adhesive or other bonding material 158 which forms the physical connection between processor 56 and printed circuit board 136. Wire 148 electrically connects a bonding pad 160 of processor 56 with a bonding pad 160 of PC board 136.

It is very important to have a low loop-height "d" for the wire 148. Conventional wire bonding techniques bond a wire first to the processor and then to the substrate, resulting in a very high loop height. A high loop height is unacceptable for electronic cards, which must be made very thin. Also, a high loop height creates a reliability problem due to bending and torsional stresses to which the electronic card may be subjected.

In accordance with an aspect of this exemplary embodiment, a reverse bonding process is used where the wire 148 is first attached to the PC board 136 and then attached to the processor 56. This results in a short loop height "d", which is preferably less than 5 mils and is more preferably 2-4 mils or less. As a result, the total height of the loop is equal to d+D, where "D" is the height of the top surface of the processor 56 above the top surface of the PC board 136. In the present example, the processor die 56 is about 9-10 mils, and the adhesive is about 1-2 mils, resulting in a height D of about 1012 mils. If the loop height d is in the range of 2-4 mils, the total height of the loop above the top surface of the PC board is in the range of 12-16 mils, in this example.

The low loop height also helps with the aforementioned bending and torsional stresses to which the electronic card may be subjected. For example, with a embodiments. As another non-limiting example, certain embodiments have only a single track coil.

In another embodiment, the processor 56 is attached to the PC board in a flip-chip fashion. Techniques for attaching dies to substrates in a flip-chip fashion are well known to those skilled in the art.

FIG. 11 shows a receptacle 160 in PC board 136 for broadcaster 68. Broadcaster 68, in this example, is inserted into receptacle 160 at a late stage of the manufacturing process and is then electrically connected to contact pads 161. When mounting broadcaster 68 inside receptacle 160 it is important to achieve a high degree of geometric alignment so that broadcaster 68 can be properly aligned with the read head of a card reader. Guides 162, visible through holes in broadcaster 68, are provided to aid in this physical alignment process. When inserting broadcaster 68 into slot 160, it is preferable that the alignment guides 162 closely align with the holes in broadcaster 68. Optical microscopes may be used to help with this process. Of course, these exemplary embodiments are given by way of example and not limitation, and other alignment techniques are suitable.

Figure 12:
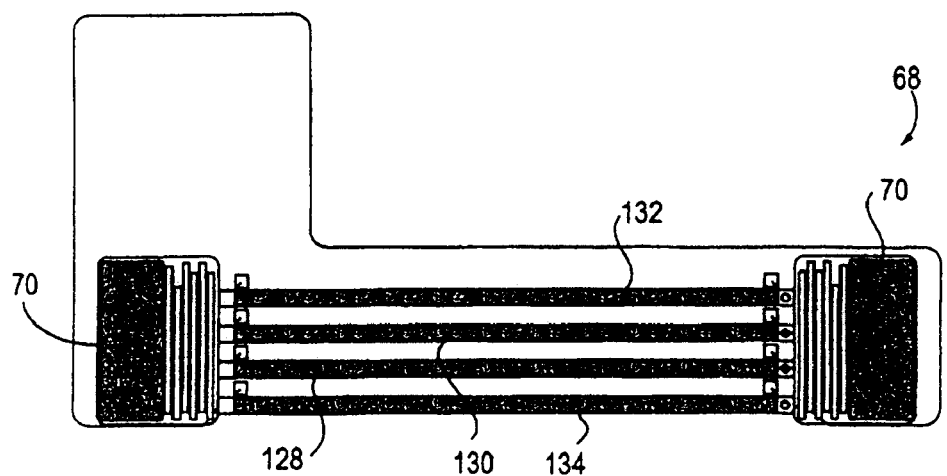
FIG. 12 is a top plan view of a broadcaster before it is inserted into the broadcaster slot illustrated in FIG. 11.

FIG. 12 shows broadcaster 68 in its final form before it is inserted into slot 160. Track one coil 128 and track two coil 130 are aligned to make optimal contact with magnetic stripe reader device 72. Track one cancellation coil 132 and track two cancellation coil 134 are positioned appropriately to perform their function of cancellation cross talk between track one coil 128 and track two coil 130. Sensors 70 are shown here as trip switches which detect the event of electronic card 10 being passed through magnetic stripe reader device 72.

These exemplary embodiments are given by way of example and not limitation. Alternatives for the composition and configuration of broadcaster 68 will be apparent to those of skill in the art. For example, alternative embodiments which do not include cancellation coils 132 and 134 are contemplated as are other alternative the dimensions set forth by ISO 7810 standard. Importantly, the thickness T should not be much greater than about 30 mils so that it works properly with legacy card readers. Other embodiments provide electronic cards of different sizes and formats.

Figure 13:
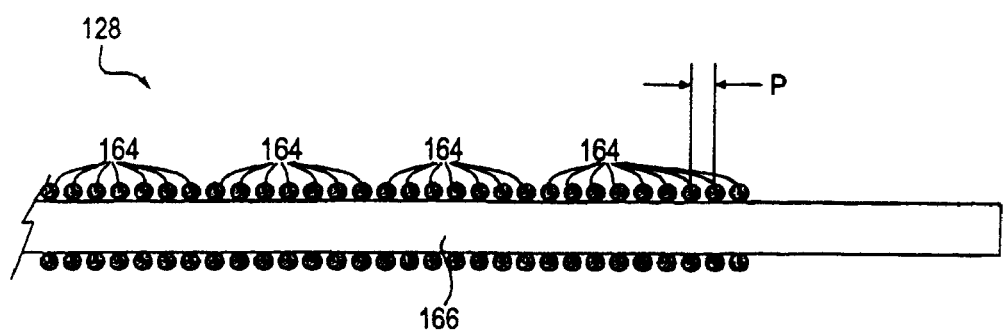
FIG. 13 illustrates an exemplary broadcaster coil.

FIG. 13 shows an exemplary broadcaster coil 128 in greater detail. The other broadcaster coils 130-134 can be of similar or identical design, or can be of different designs in alternated embodiments. In this embodiment, a wire 164 is wound around a ferromagnetic core 166. The wire 164 can be made from, for example, copper or aluminum, alloys thereof, etc. The wire 164 may be insulated, or the core 166 may be insulating or insulated to prevent the windings of wire 164 from shorting out.

In an exemplary embodiment, broadcaster core 166 is composed of a material called "HyMu 80", with favorable magnetic properties, which is commercially available from National Electronic Alloys Inc. A single strand of copper wire 164 is wound around broadcaster core 166 at regularly spaced intervals, e.g. with a constant pitch "P." In an exemplary embodiment, the pitch of the wire coil is about 4.8 mils. This exemplary embodiment is given by way of example and not limitation, as other pitches and variable pitches are suitable in certain embodiments.

Figure 14:
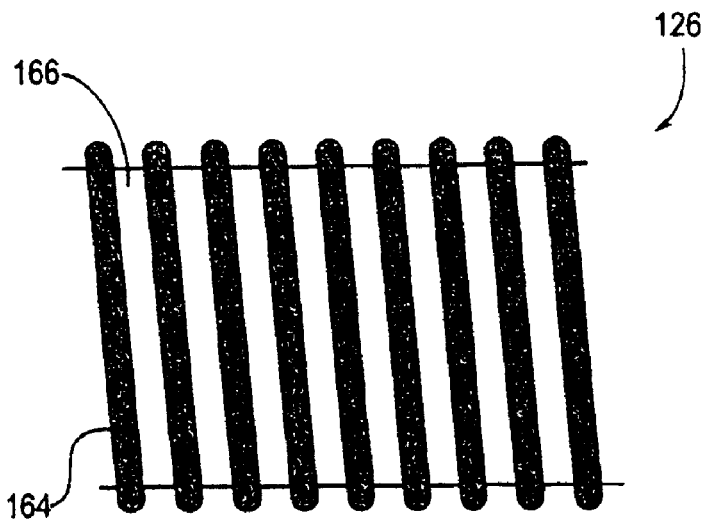
FIGS. 14-16 illustrate exemplary winding patterns of the broadcaster coil of FIG. 13.

FIG. 14 shows an exemplary spacing of wire 164 coiled around core 166. FIG. 14 shows a regular spacing between each coil wind of copper wire 164 with a constant pitch. This is a preferred embodiment although other embodiments may be used.

Figure 15:
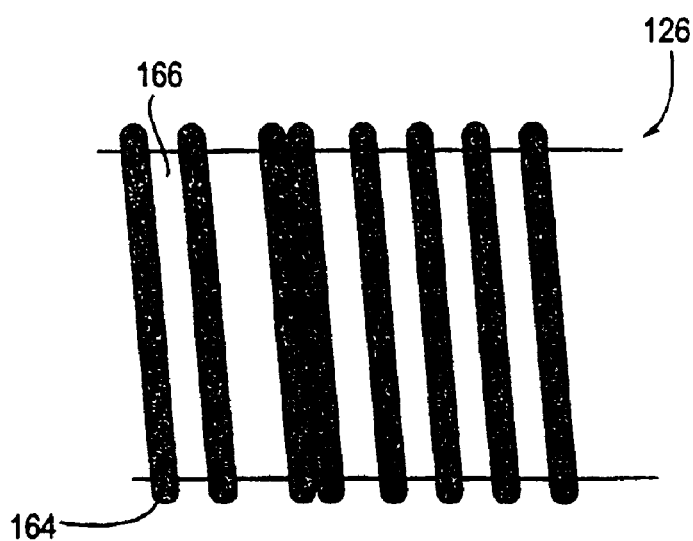

FIG. 15 shows a somewhat irregular winding. Even though some errors may be introduced during the winding process, it is possible to still use the resulting broadcaster coils despite some error in the winding process as shown in FIG. 15. The pitch may also be varied to modify the magnetic flux pattern.

However, if too much error is introduced during the manufacture of broadcaster coil 126, then the coil may be inoperative. It has been found that if the variation in pitch is too great, errors may be introduced into the dynamic magnetic field produced by the coils, resulting in improper operation of the emulator embodiment of electronic card 10.

Figure 16:
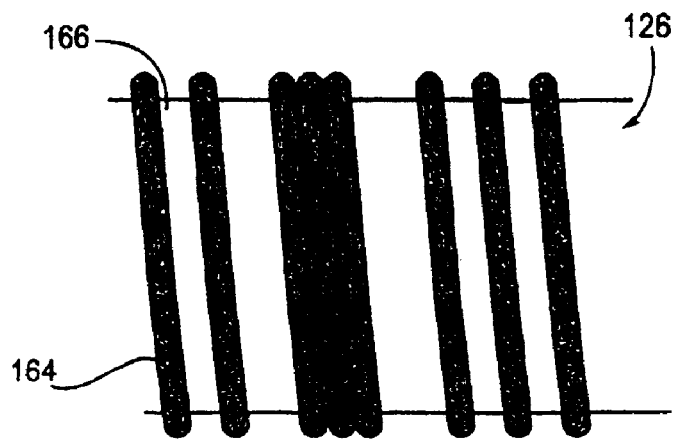

FIG. 16 depicts an example of too much error in the positions of the coil windings of broadcaster coil 126. It is important to note that many variables exist which affect the threshold of operability and that the broadcaster coil 126 should be tested in order to ensure proper quality. It may not be necessary to test each and every coil but a sampling of broadcaster coils 126 should be tested to ensure that a manufactured batch of coils is operative. FIGS. 14 through 16 are given as examples of alternative coil windings and should not be construed in a limiting way.

The aforementioned embodiments for the coils teach winding a wire around a ferromagnetic core. In alternate embodiments, the coils can be made in other fashions. For example, coils can be made with various deposition, patterning, and etching techniques. As will be appreciated by those skilled in the art, a ferromagnetic core can be coated with an insulating film, and then coated with a conductive (usually metal) layer of, for example, copper or aluminum or alloys thereof by, by way of example and not limitation, sputtering and nano-sputtering techniques. A mask can then be applied to the conductive layer to define the coil, and portions of the conductive layer can be etched away to provide the windings. The mask can be made photolithographically, by spraying with, for example, ink jet technologies, or by other techniques well known to those skilled in the art. The etching can be accomplished with an acid which attacks the conductive layer but which is stopped by the insulating film. This method of coil production may have advantages in high-volume manufacturing situations.

For example, a ferromagnetic coil can be prepared and cleaned. An insulating and/or etch stop layer can be applied by a variety of techniques including, but not limited to, dipping, spraying, coating, sputtering, CVD, etc. A metal or other conductive layer can then be applied, again by a variety of techniques including, but not limited to, dipping, spraying, coating, sputtering, CVD, etc. A mask layer can be applied as a photolithographic material, by painting, printing, spraying, stenciling, etc., as will be appreciated by those skilled in the art. The etching of the conductive layer through the mask layer can be accomplished by a variety of techniques including, but not limited to, dipping, spraying, immersing, and plasma etching techniques. The mask layer is then removed, and a pacifying layer may be applied to protect the coil assembly.

As will be appreciated by those skilled in the art, there are other ways to produce the effects of the "coils" of the broadcaster. For example, magnetic material can be lithographically sputtered to create the broadcaster coil effect. There are a variety of mass production techniques such as those noted above, by example, which will be apparent to those skilled in the art of semiconductor and micro-machine manufacturing.

Figure 17:
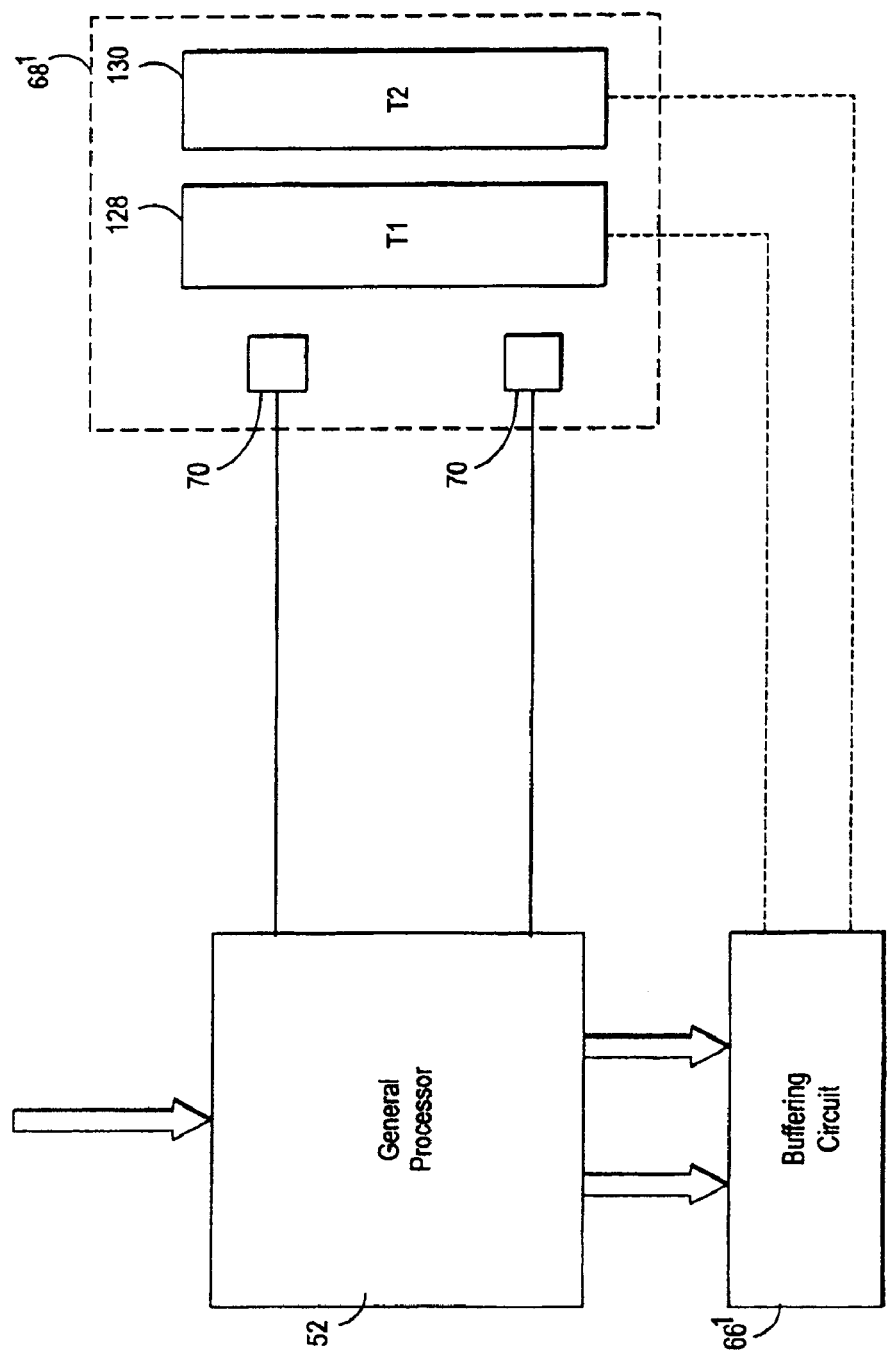
FIG. 17 is a block diagram of an alternate embodiment, set forth by way of example and not limitation, of a broadcaster assembly.

FIG. 17 shows an alternate embodiment which allows a broadcaster 68' to operate without cancellation coils. Track one coil 128 and track two coil 130 are shown within broadcaster 68'. Buffering circuit 66', in this embodiment, is designed to perform cancellation prior to emitting the wave forms to track one coil 128 and track two coil 130. The wave forms are adjusted in such a way that the overall cross talk effect between track one coil 128 and track two coil 130 produces the desired magnetic flux. This alternate embodiment cancels cross talk by correcting the wave forms so that the appropriate signals to be received by magnetic stripe reader device 72. In this embodiment, buffering circuit 66' may be an ASIC, a DSP, or other appropriate components for signal processing. Sensors 70 are present in this embodiment of broadcaster 68.

In one exemplary alternative embodiment, general processor 52 is comprised of an ASIC chip, which optionally includes one or more other components of exemplary transaction card 10. For example, the ASIC assumes the role of buffering circuit 66 as well as the duties of other components associated with general processor 52 in the previously disclosed embodiments. Further, the ASIC embodiment could, for example, produce adjusted waveforms for track 1 coil 128 and track 2 coil 130 so that it is not necessary to include track 1 cancellation coil 132 or track 2 cancellation coil 134. For example, the ASIC could apply a correction to the amplitude and phase of the waveform of track 1 coil 128 because of the anticipated effect of magnetic flux interference from track 2 coil 130. Likewise, a correction would be applied to the waveform for track 2 coil 130, to cancel the effect of track 1 coil 128.

Note that the corrections applied to the waveform may vary with time because the interference from the opposing broadcaster coil 126 may vary with time (at different parts of the waveform). Thus, the correction constitutes two new waveforms for the two respective broadcaster coils 128 and 130 of this exemplary embodiment. Note also that the correction waveform for a given broadcaster coil 128 will itself cause interference with the opposing broadcaster coil 130, and vice versa.

In some exemplary embodiments, an additional correction is applied to compensate for the effect of the previous correction. In still further exemplary embodiments, one or more additional corrections are applied until the diminishing effect of interference becomes negligible as the series converges. Note that these corrections are performed in a computational manner before the corresponding portions of the waveforms reach the broadcaster 68.

In a further alternative embodiment, the crosstalk cancellation is performed in a linear RC circuit which outputs corrected waveforms to track 1 coil 128 and track 2 coil 130. This RC circuit could be disposed within the exemplary ASIC described above or external to the ASIC. Again, this embodiment is provided by way of example and not limitation.

Figure 18:
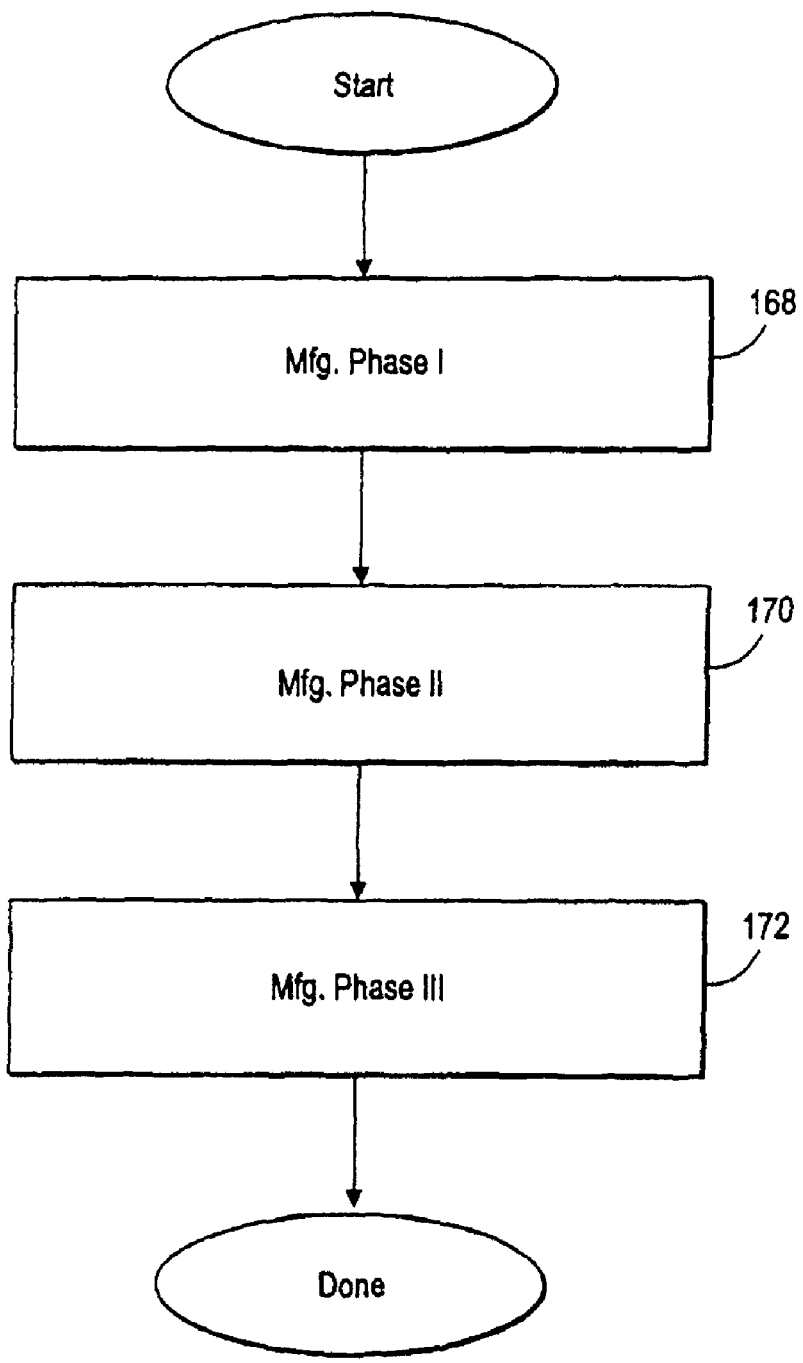
FIG. 18 is a flow-diagram of a manufacturing process, set forth by way of example and not limitation, for producing electronic cards.

FIG. 18 shows a manufacturing process for producing electronic card 10. In an operation 168, a first phase of the manufacturing process is performed. During this process, the various components are mounted and programmed. An operation 170 continues this process of manufacture in a second phase by installing additional components such as the broadcaster 68 and battery 121. Finally, the manufacturing process is completed in a third phase by an operation 172 which performs an epoxy fill.

Figure 19:
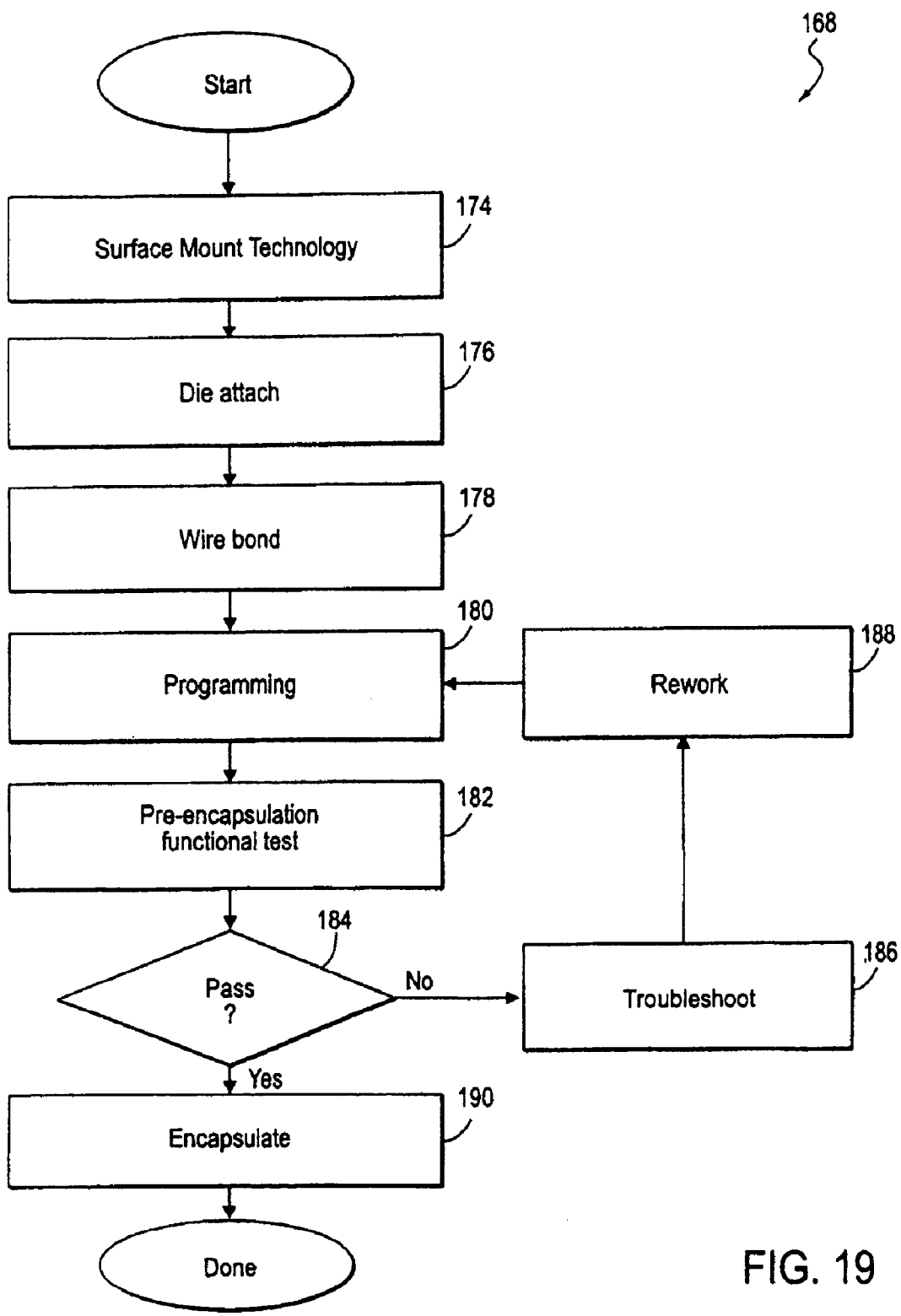
FIG. 19 is a flow-diagram illustrating an exemplary Phase I manufacturing process 168 of FIG. 18 in greater detail.

FIG. 19 shows the first phase 168 of manufacturing in greater detail. In an operation 174 technology components are mounted to the surface of their associated printed circuits. In an operation 176, the die is attached. Previously described wiring bonding process may be performed in an operation 178 to electrically connect the die to the printed circuit board. Then, in a programming step 180, secure processor 44 and general processor 52 are programmed with various data and programs necessary for the operation of electronic card 10. An operation 182 performs a functional test prior to encapsulation to ensure that the programming was successfully loaded and the various electrical connections were secure.

In a decision step 184, it is determined whether or not the functional test has been passed. If it is not, then, control passes to an operation 186, wherein the problem which causes the failure is determined. Then, in an operation 188, the problem is reworked in an operation 188 and, then, control passes again to programming step 180. If, on the other hand, in decision step 184 it is determined that the functional test is passed, then, an encapsulation process is performed in step 190. Once encapsulation is completed, the first phase of manufacture is completed. The process shown here is exemplary and as will be apparent to those of skill in the art, many alternative embodiments may be used. That is, this process is described by way of example and not limitation.

Figure 20:
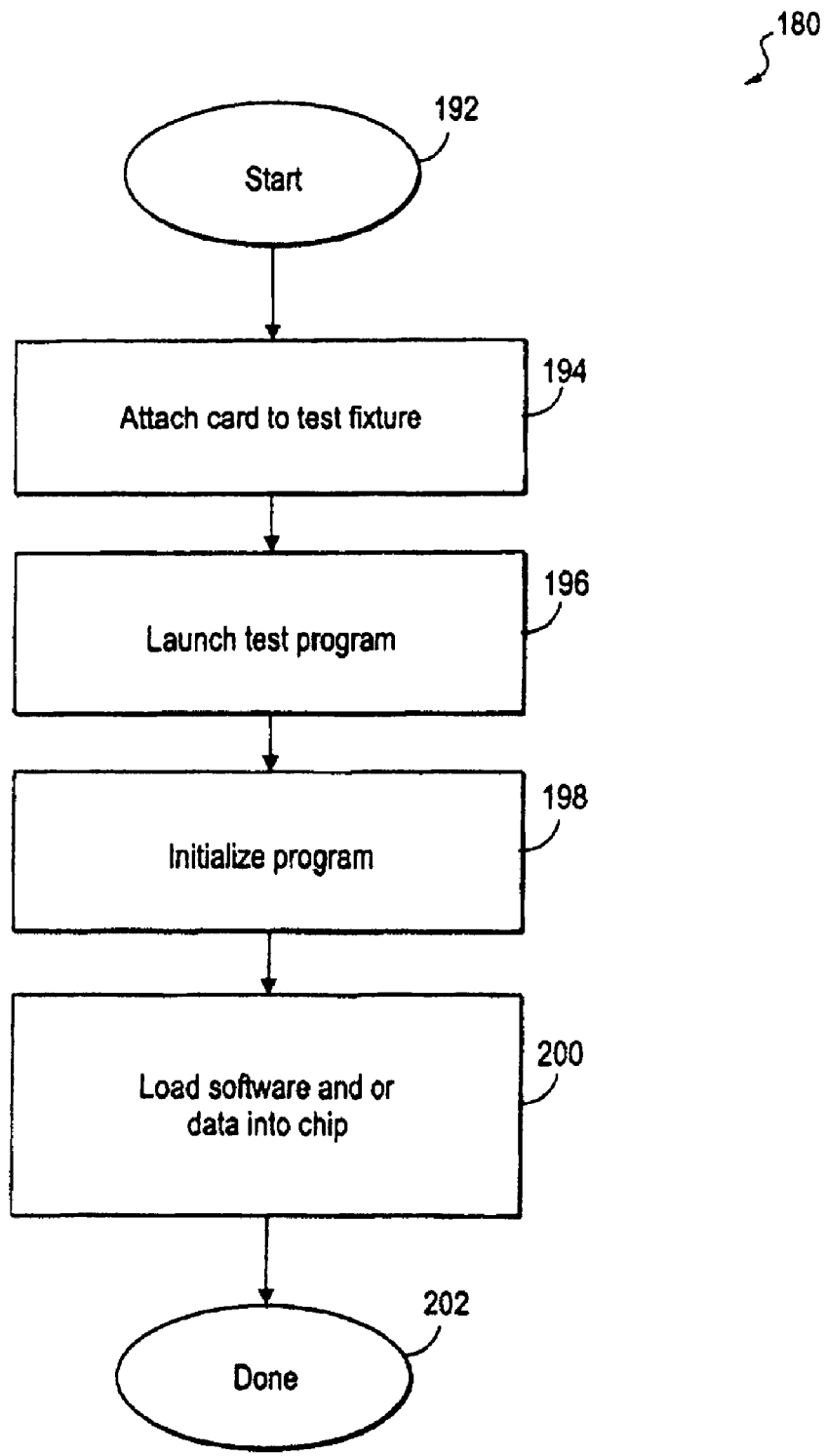
FIG. 20 is a flow-diagram illustrating an exemplary programming process 180 of FIG. 19 in greater detail.

FIG. 20 describes the programming operation 180 in greater detail. The operation is commenced in an operation 192 and continues in an operation 194 wherein electronic card 10 is attached to a test rig. A test program is launched on the test rig in an operation 196. The purpose of this test program is to load data and programs on to the technology components of electronic card 10, such as secure processor 44 and general processor 52. In an operation 198, the test program is initialized. This may involve loading various parameters and settings from a file or obtaining them from a user. An operation 200 performs the actual loading of the software and data on to the technology components aforementioned. Then, in an operation 202, the process is concluded. This process is shown in terms of its exemplary embodiments and should not be construed in a limiting way.

Figure 21:
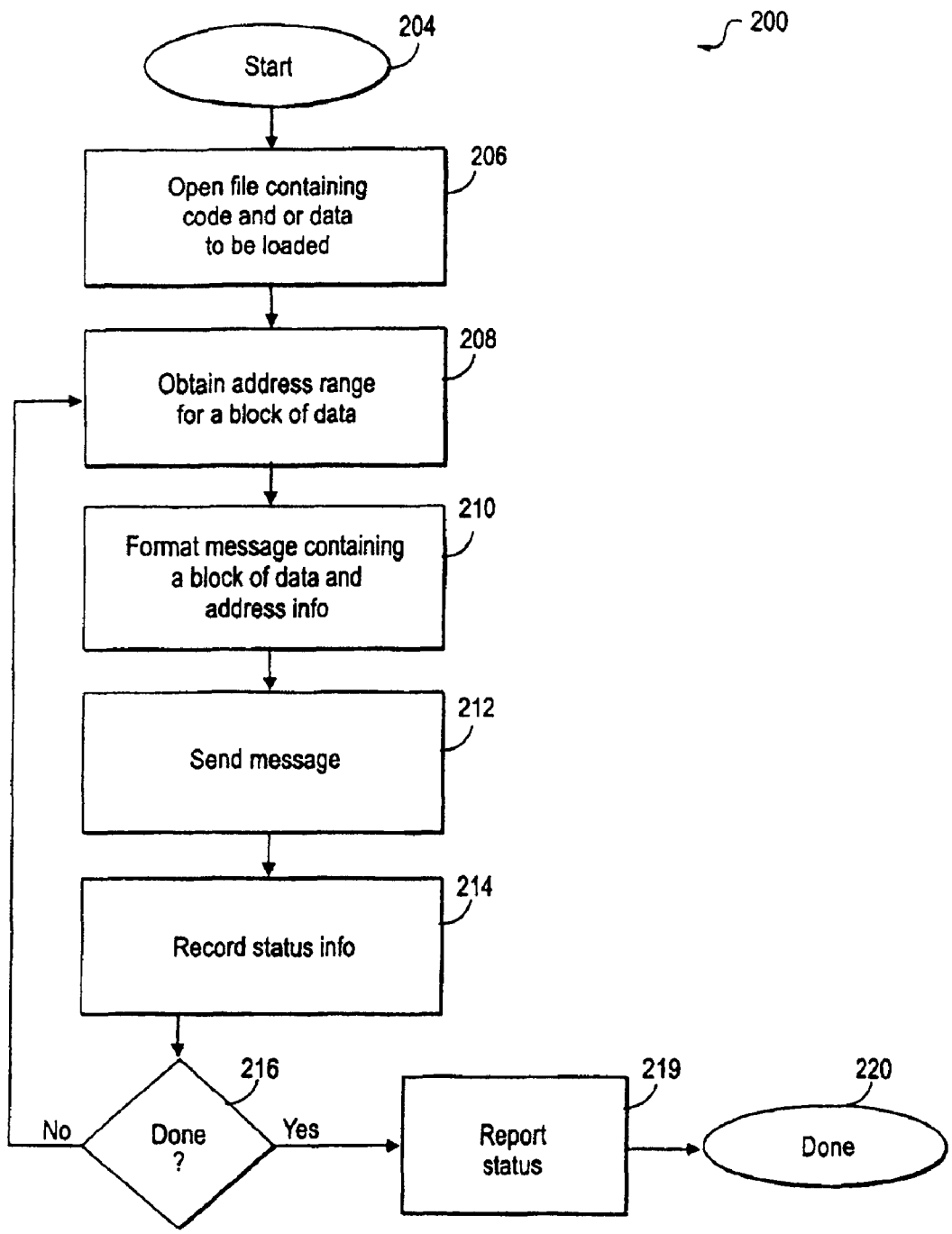
FIG. 21 is a flow-diagram illustrating an exemplary "load software and/or data into chip" process 200 of FIG. 20 in greater detail.

FIG. 21 shows operation 200 of FIG. 20 in greater detail. This operation is used to load software and data into the technology components of electronic card 10. The operation is commenced with an operation 204 and continues with an operation 206, which opens a file containing the code and data to be loaded. Then, in an operation 208, an address range is obtained for a specific block of data. This address range is used when communicating with secure processor 44 and general processor 52 to specifically identify the locations in EEPROM where this particular block of data should be stored. As is understood by those skilled in the art, the data could comprise programs. In an operation 210, a message is formatted which contains a block of data and the address information. Then, in an operation 212, the message is sent. An operation 214 receives and records status information. A decision operation 216 determines whether or not the last block has been sent or if, for other reasons, the process should be terminated, such as in the case of an error. If it is determined that the loading operation should continue, control passes back to operation 208. If in operation 216 it is determined that the process should terminate, control passes to an operation 218 which reports the status of the loading operation and, then, the process is concluded in an operation 220.

Figure 22:
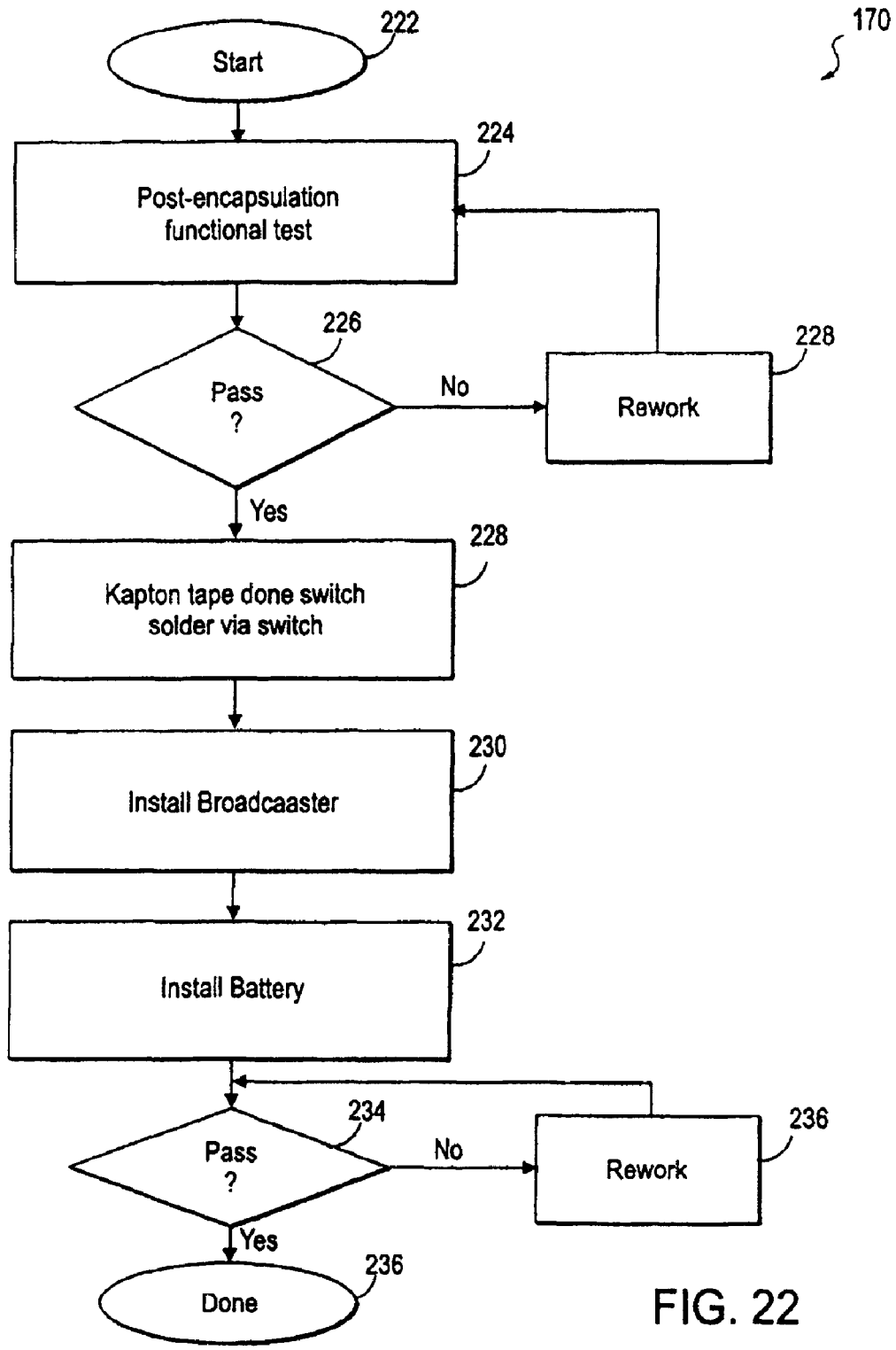
FIG. 22 is a flow-diagram illustrating an exemplary Phase II manufacturing process 170 of FIG. 18 in greater detail.

FIG. 22 shows the second phase of manufacturing operation 170 in greater detail. The process starts in an operation 222 and continues in an operation 224, which performs a functional test on the device. In a decision operation 226, it is determined whether or not the functional test has been passed and, if it has not, control passes to an operation 228 where corrective action is taken. Control then passes to back to operation 224. If, in operation 226, it is determined that the functional test has been passed, control passes to operation 228 wherein the dome switch is taped and the via switch is soldered. Then, in an operation 230, broadcaster 68 is installed in the slot provided for it within electronic card 10. Then, in an operation 232, battery 121 is installed. In an operation 234, the assembly is inspected and tested. If it is determined in operation 234 that the assembly is not functioning properly, control passes to an operation 236 where corrective action is taken. Control then passes back to operation 234. If it is determined in operation 234 that the assembly is working correctly, control passes to an operation 236 which ends the process. These exemplary embodiments are given by way of example and not limitation.

Figure 23:
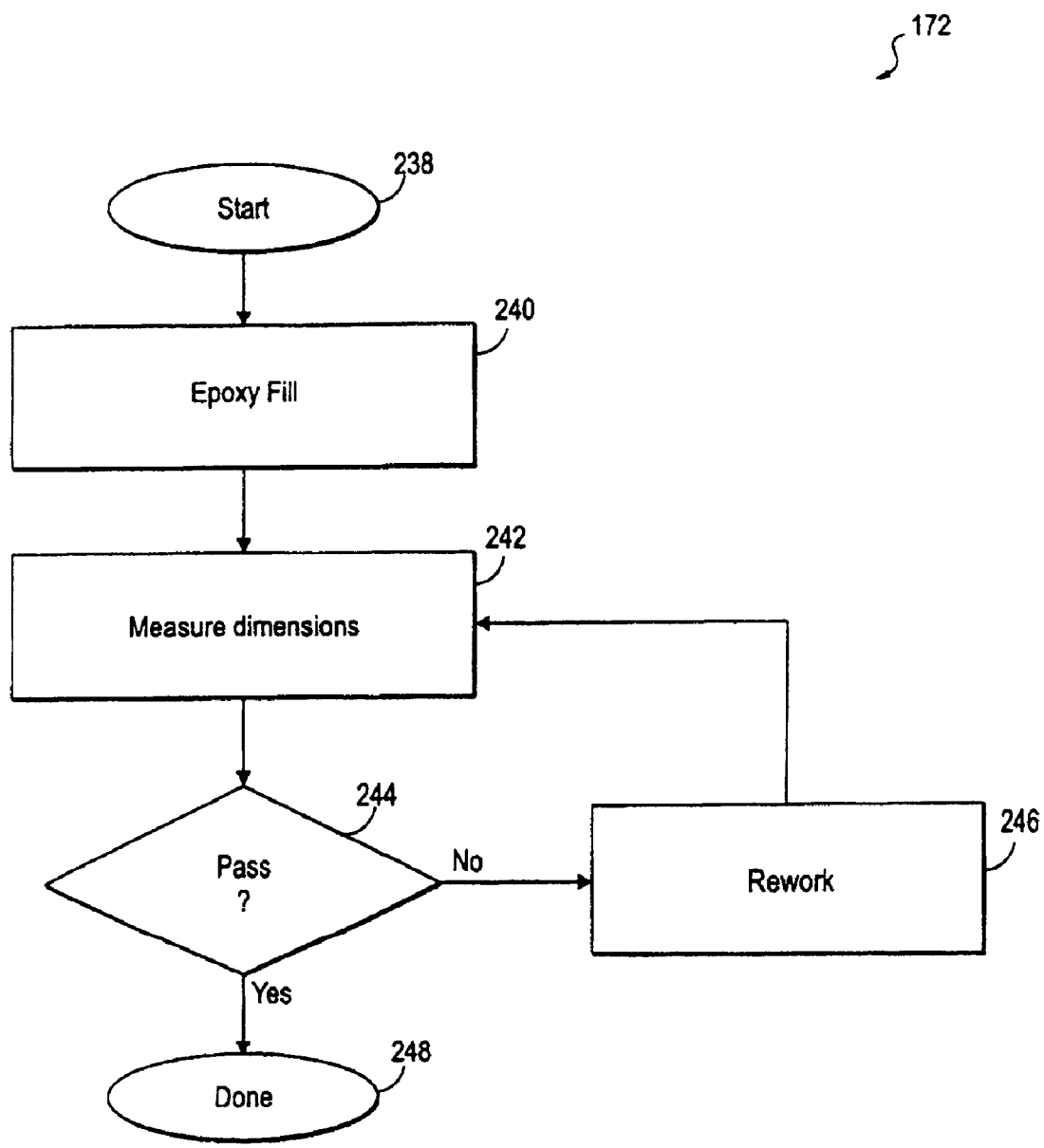
FIG. 23 is a flow-diagram illustrating an exemplary Phase III manufacturing process 172 of FIG. 18 in greater detail.

FIG. 23 describes the third phase 172 of the manufacturing process. It begins with an operation 238 and continues with an operation 240 wherein the assembly of electronic card 10 is filled with epoxy, laminated and tested. Then, in an operation 242, various measurements of the assembly are taken and, in a decision step 244, it is determined whether or not the assembly needs to be reworked. If it is determined in operation 244 that the assembly needs to be reworked, corrective action is taken in operation 246, and control is passed back to operation 244. If it is determined in operation 244 that the assembly does not require reworking, control is passed to operation 246, which concludes the process.

The above described exemplary manufacturing process, and variants thereof, may be used to a variety of embodiments of transaction card 10. For example, a variant of the manufacturing process uses photolithography techniques well known to those skilled in the art to produce broadcaster 68. This method avoids the use of coil winding, which may save time and money when manufacturing transaction card 10 in large numbers.

Another variant of the process would use the "flip chip" method well known to those skilled in the art to mount one or more technology components such as general processor 52. Optionally, this variant would include the use of an ASIC as general processor 52. This embodiment is given by way of example and not limitation.

An alternative exemplary embodiment of non-contact communication port 77 of FIG. 3 comprises a WiFi device or equivalent, which allows this embodiment of transaction card 10 to communicate with the internet independently of a card reader. By non-limiting example, the WiFi 802.1 lb and 802.1 lg protocols may be used. The card could periodically download and upload information, and also perform transactions in response to user input. Information from the internet could be displayed to the user and interaction with the World Wide Web would also be possible in certain embodiments. This embodiment would preferably include an LCD display or equivalent and a touch screen or equivalent. This embodiment is given by way of example and not limitation.

Although various embodiments have been described using specific terms, and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged either in whole or in part. It is therefore intended that the claims be interpreted in accordance with the true spirit and scope of the invention without limitation or estoppel.

What is claimed is:

1. An apparatus for providing transaction specific data of a user, comprising:
   a secure processor conforming to International Standards Organization specification 7816;
   a non-secure processor;
   a power source;
   a general purpose input/output ("I/O") for receiving an input from the user to the apparatus electrically connected to the non-secure processor;
   an output port for providing an output from the apparatus that is readable by a magnetic stripe reader;

wherein the secure processor, the non-secure processor, the power source, the general purpose I/O and the output port are mounted together within said apparatus; and wherein transaction specific data provided by a secure function of the secure processor can be accessed without any intervention by a secure card terminal.

2. The apparatus of claim 1, wherein transaction specific data is provided in the output.

3. The apparatus of claim 2, further comprising a second general purpose I/O mounted in said apparatus electrically connected to the non-secure processor for providing a user output to the user from the apparatus.

4. The apparatus of claim 2, further comprising an electrical interface electrically connected to the secure processor that can be accessed by the secure card terminal.

5. The apparatus of claim 2, further comprising a non-contact communications port coupled to at least one of said secure processor and said non-secure processor for providing a second output from the apparatus with transaction specific data that is not readable by the magnetic stripe reader.

6. The apparatus of claim 2, wherein the output port is a magnetic stripe emulator.

7. The apparatus of claim 6, wherein the magnetic stripe emulator is comprised of a broadcaster used to broadcast a fluctuating magnetic signal which emulates the movement of a magnetic stripe of a transaction card past a read head of a magnetic card reader.

8. The apparatus of claim 7, further comprising at least one sensor electrically coupled to the non-secure processor for providing a signal to the non-secure processor for controlling timing of a broadcast of the fluctuating magnetic signal by the broadcaster.

9. The apparatus of claim 8, wherein the broadcaster is further comprised of: a coil including an elongated core material and a winding having a plurality of turns around said core material; and a signal generator having a broadcaster driver signal coupled to said coil such that said coil provides a dynamic magnetic field which emulates the swiping of a magnetic stripe transaction card past a read head of the magnetic stripe reader.

10. The apparatus of claim 9, further comprising one or more sensors electrically coupled to the non-secure processor for providing a signal to the non-secure processor that a physical act of swiping the apparatus through the read head of the magnetic stripe reader has commenced.

11. The apparatus of claim 10, wherein the non-secure processor uses the signal to control timing of an initiation of the dynamic magnetic field.

12. The apparatus of claim 10, wherein the dynamic magnetic field is comprised of: a first track coil magnetic field that emulates the movement of a first track of the magnetic stripe of the transaction card past the read head; and a second track coil magnetic field that emulates the movement of a second track of the magnetic stripe of the transaction card past the read head.

13. The apparatus of claim 12, further comprising means for reduction of interference between the first track coil magnetic field and the second track coil magnetic field.

14. An apparatus for providing transaction specific data of a user, comprising:
a secure processor conforming to International Standards Organization specification 7816;
a non-secure processor;
a power source;
a general purpose input/output ("I/O") for receiving an input from the user to the apparatus electrically connected to the non-secure processor;

a second general purpose I/O mounted in said apparatus electrically connected to the non-secure processor for providing a user output to the user from the apparatus;
a broadcaster used to broadcast a fluctuating magnetic signal which emulates the movement of a magnetic stripe of a transaction card past a read head of a magnetic card reader, said broadcaster being further comprised of:
a coil including an elongated core material and a winding having a plurality of turns around said core material; and a signal generator having a broadcaster driver signal coupled to said coil such that said coil provides a dynamic magnetic field which emulates the swiping of a magnetic stripe transaction card past a read head of the magnetic stripe reader; and
one or more sensors electrically coupled to the non-secure processor for providing a signal to the non-secure processor that a physical act of swiping the apparatus through the read head of the magnetic stripe reader has commenced;
wherein transaction specific data provided by a secure function of the secure processor can be accessed without any intervention by a secure card terminal;
wherein transaction specific data is provided in the output; and
wherein the non-secure processor uses the signal to control timing of an initiation of the dynamic magnetic field.

15. The apparatus of claim 14, wherein the dynamic magnetic field is comprised of: a first track coil magnetic field that emulates the movement of a first track of the magnetic stripe of the transaction card past the read head; and a second track coil magnetic field that emulates the movement of a second track of the magnetic stripe of the transaction card past the read head.

16. The apparatus of claim 15, further comprising means for reduction of interference between the first track coil magnetic field and the second track coil magnetic field.

17. An apparatus for providing transaction specific data of a user, comprising: a secure processor; a non-secure processor; a power source; a general purpose input/output ("I/O") for receiving an input from the user to the apparatus electrically connected to the non-secure processor; a magnetic stripe emulator for providing an output from the apparatus that is readable by a magnetic stripe reader, said magnetic stripe emulator being comprised of a broadcaster used to broadcast a fluctuating magnetic signal which emulates the movement of a magnetic stripe of a transaction card past a read head of a magnetic card reader, said broadcaster being comprised of a coil including an elongated core material and a winding having a plurality of turns around said core material; one or more sensors electrically coupled to the non-secure processor for providing a signal to the non-secure processor that a physical act of swiping the apparatus past the read head of the magnetic stripe reader has commenced which the non-secure processor uses to control timing of an initiation of the dynamic magnetic field; a signal generator having a broadcaster driver signal coupled to said coil such that said coil provides a dynamic magnetic field which emulates the swiping of a magnetic stripe transaction card past the read head of the magnetic stripe reader, wherein the dynamic magnetic field is comprised of a first track coil magnetic field that emulates the movement of a first track of the magnetic stripe of the transaction card past the read head and a second track coil magnetic field that emulates the movement of a second track of the magnetic stripe of the transaction card past the read head; and at least one sensor electrically coupled to the non-secure processor for providing a signal to the non-secure processor for controlling timing of a broadcast of the fluctuating magnetic signal by the broadcaster; wherein the secure processor, the non-secure processor, the power source, the general purpose I/O and the output port are mounted together within said apparatus; wherein transaction specific data provided by a secure function of the secure processor can be accessed without any intervention by a secure card terminal; and wherein transaction specific data is provided in the output.

* * * * *